United States Patent
Hao et al.

(10) Patent No.: US 9,706,249 B2
(45) Date of Patent: Jul. 11, 2017

(54) EXTENDED, HOME, AND MOBILE CONTENT DELIVERY NETWORKS

(71) Applicant: Verizon Patent and Licensing Inc., Basking Ridge, NJ (US)

(72) Inventors: Jianxiu Hao, Acton, MA (US); Jian Huang, Sudbury, MA (US); Martin A. Busse, Woburn, MA (US); Michael P. Ruffini, Methuen, MA (US); Gaurav D. Mehta, Brookline, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 312 days.

(21) Appl. No.: 14/211,707

(22) Filed: Mar. 14, 2014

(65) Prior Publication Data
US 2015/0264408 A1    Sep. 17, 2015

(51) Int. Cl.

| | |
|---|---|
| *H04N 7/16* | (2011.01) |
| *H04N 21/433* | (2011.01) |
| *H04N 21/258* | (2011.01) |
| *H04N 21/414* | (2011.01) |
| *H04N 21/4147* | (2011.01) |
| *H04N 21/478* | (2011.01) |
| *H04N 21/63* | (2011.01) |
| *H04N 21/647* | (2011.01) |

(52) U.S. Cl.
CPC ... *H04N 21/4334* (2013.01); *H04N 21/25841* (2013.01); *H04N 21/25891* (2013.01); *H04N 21/4147* (2013.01); *H04N 21/41407* (2013.01); *H04N 21/4781* (2013.01); *H04N 21/632* (2013.01); *H04N 21/64776* (2013.01)

(58) Field of Classification Search
CPC .................................................. H04N 21/2225
USPC ........................................................... 725/23
See application file for complete search history.

(56) References Cited

U.S. PATENT DOCUMENTS

| | | | |
|---|---|---|---|
| 6,438,596 B1 * | 8/2002 | Ueno ................. | H04N 7/17336 348/E5.008 |
| 8,799,977 B1 * | 8/2014 | Kapner, III ...... | H04N 21/23113 709/212 |
| 2006/0230176 A1 * | 10/2006 | Dacosta ............. | H04N 5/44543 455/456.3 |
| 2007/0157281 A1 * | 7/2007 | Ellis ................... | H04N 7/17309 725/134 |

(Continued)

*Primary Examiner* — Michael B Pierorazio

(57) ABSTRACT

A method, a device, and a non-transitory storage medium provide an extended content delivery network service in which user devices are configured as extended content delivery network devices that download and/or stream programs to other users of the extended content delivery network service. Additionally, a method, a device, and a non-transitory storage medium provide an in-home media server device that stores programs in a same format as a format of the programs stored in a content delivery network, and provide an error correction service in which a portion of a program including an error, initially received via a multicast or broadcast transmission, is replaced with a corrected portion of the program via a unicast transmission. Still further, a method, a device, and a non-transitory storage medium provide a mobile extended content delivery network device that downloads or streams programs to other users of the extended content delivery network service.

23 Claims, 17 Drawing Sheets

(56) References Cited

U.S. PATENT DOCUMENTS

| | | | |
|---|---|---|---|
| 2008/0081640 A1* | 4/2008 | Tran | H04L 29/06027 709/235 |
| 2008/0235733 A1* | 9/2008 | Heie | H04N 7/163 725/46 |
| 2011/0112909 A1* | 5/2011 | Singh | G06Q 30/0269 705/14.66 |
| 2011/0191445 A1* | 8/2011 | Dazzi | G06F 15/16 709/219 |
| 2013/0198770 A1* | 8/2013 | Xiong | H04N 21/654 725/25 |
| 2014/0196079 A1* | 7/2014 | Jannard | H04L 9/0825 725/31 |

* cited by examiner

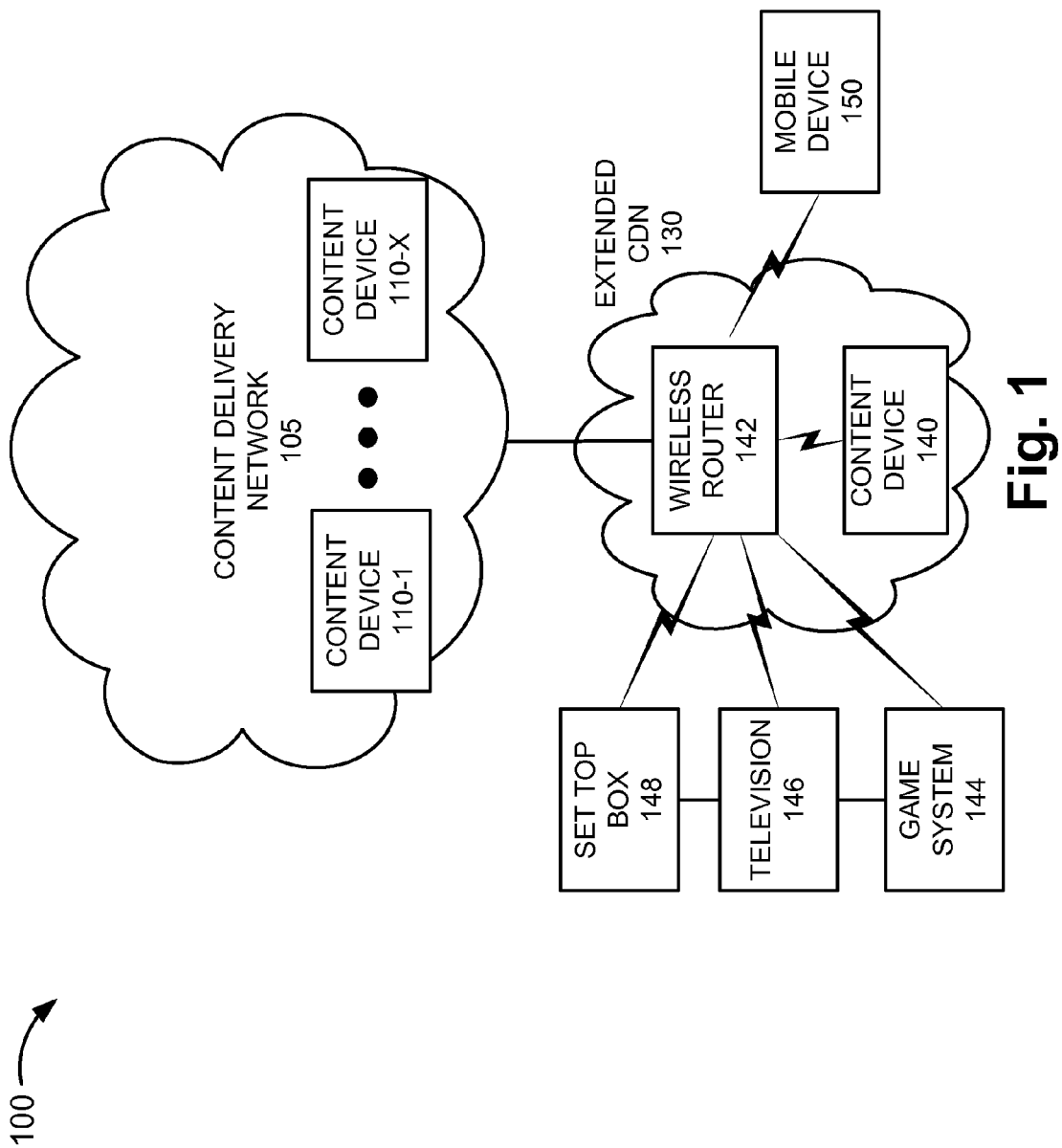

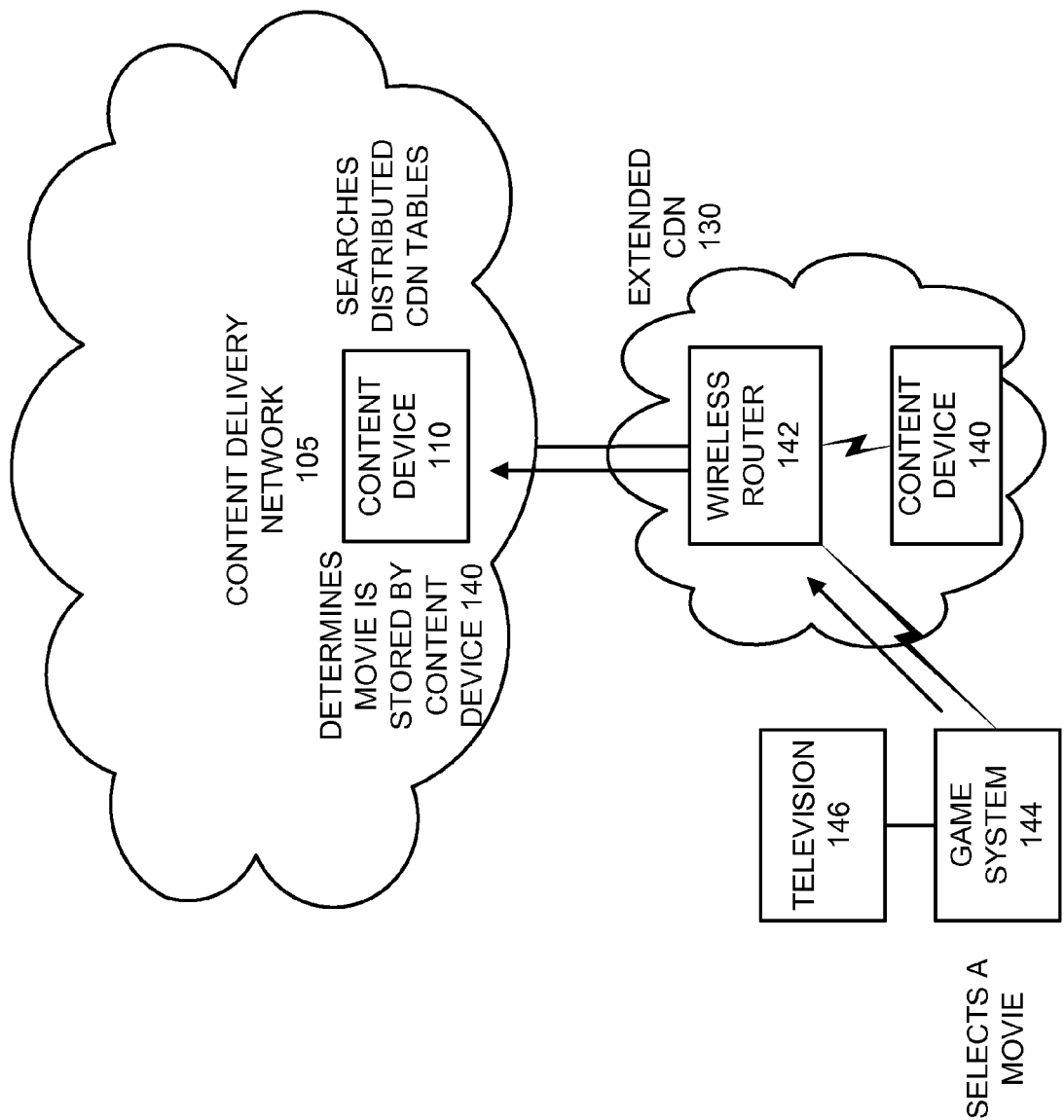

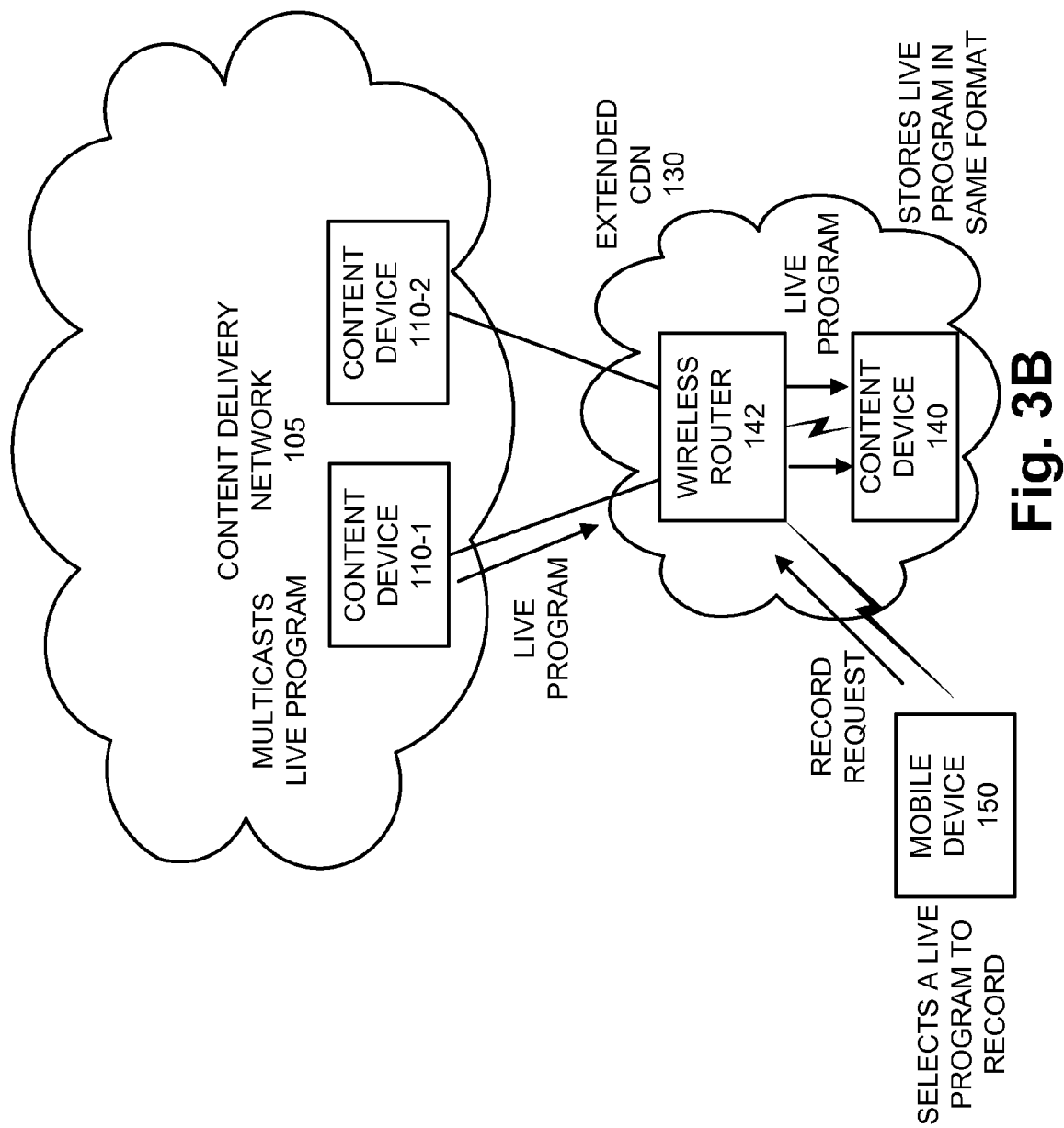

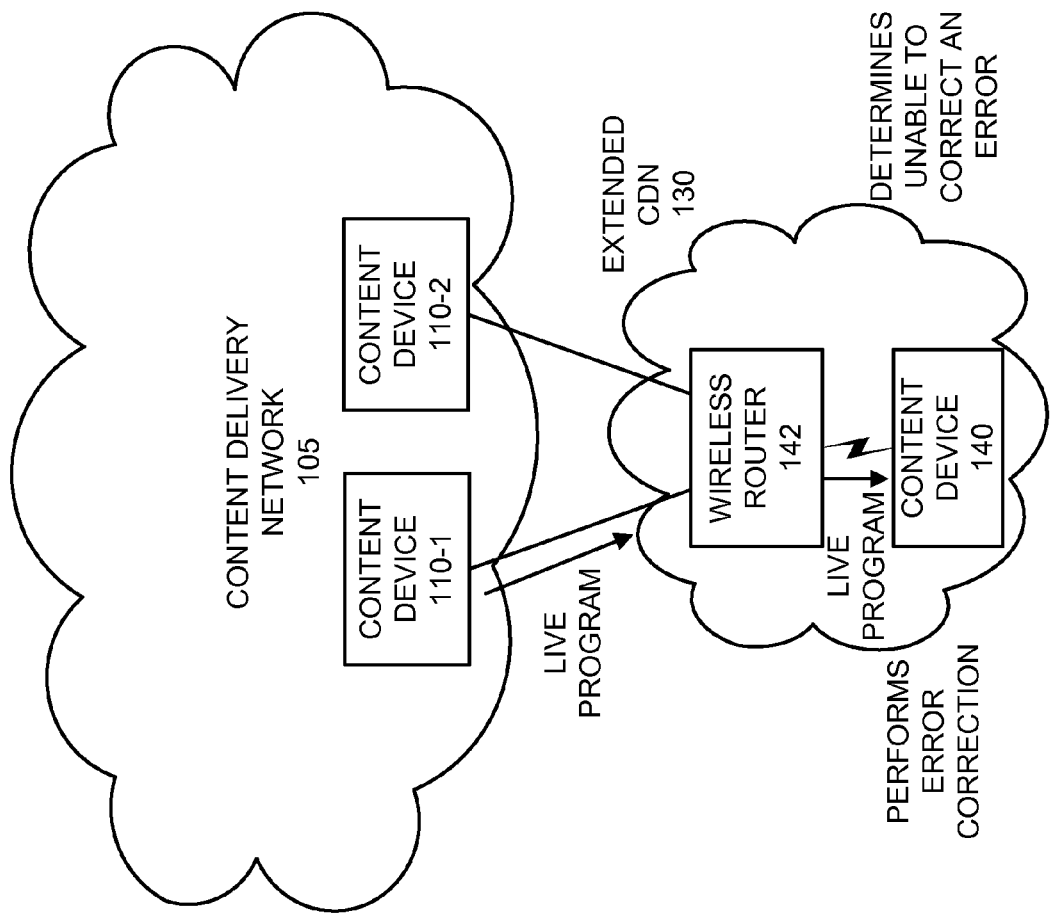

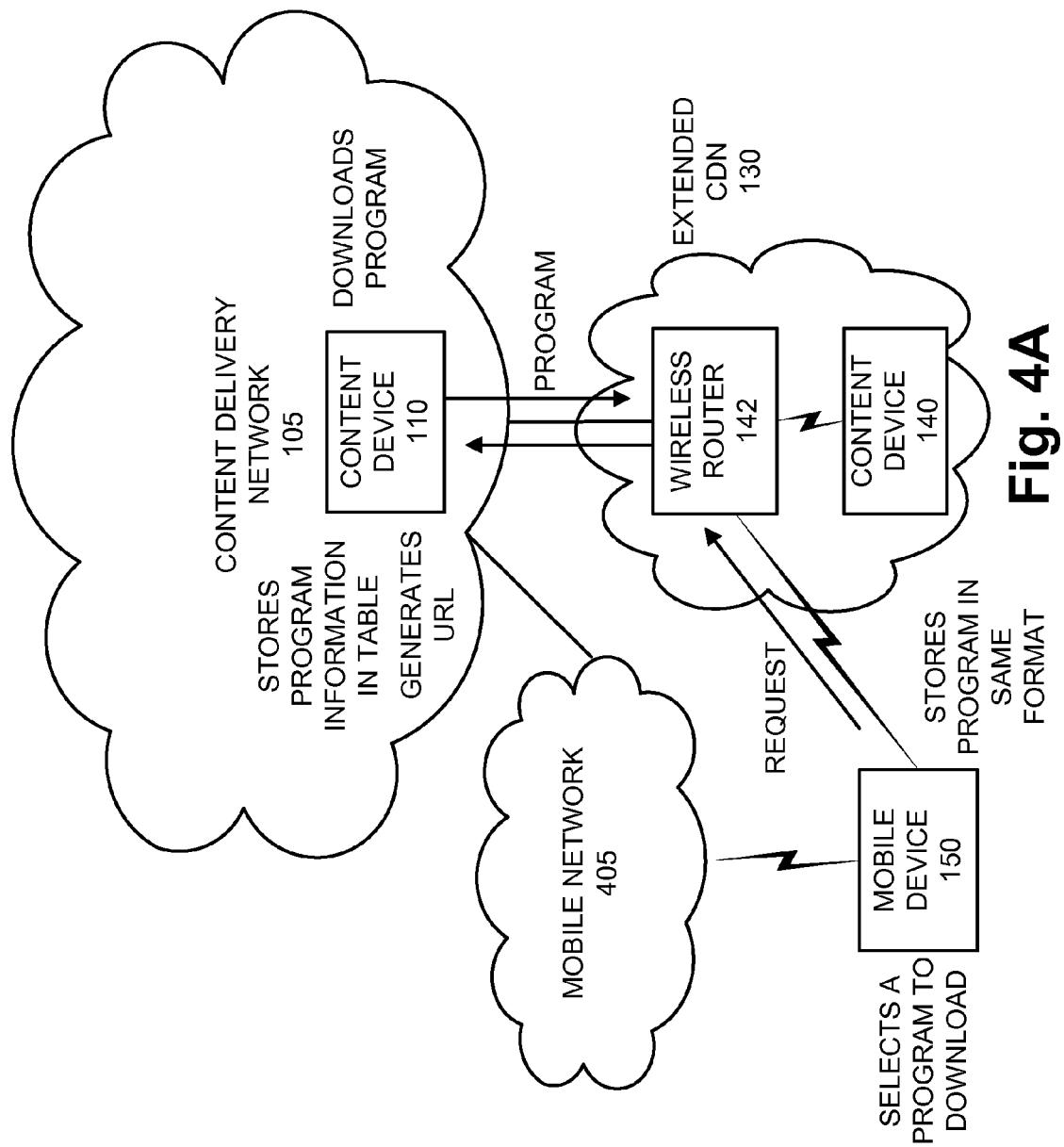

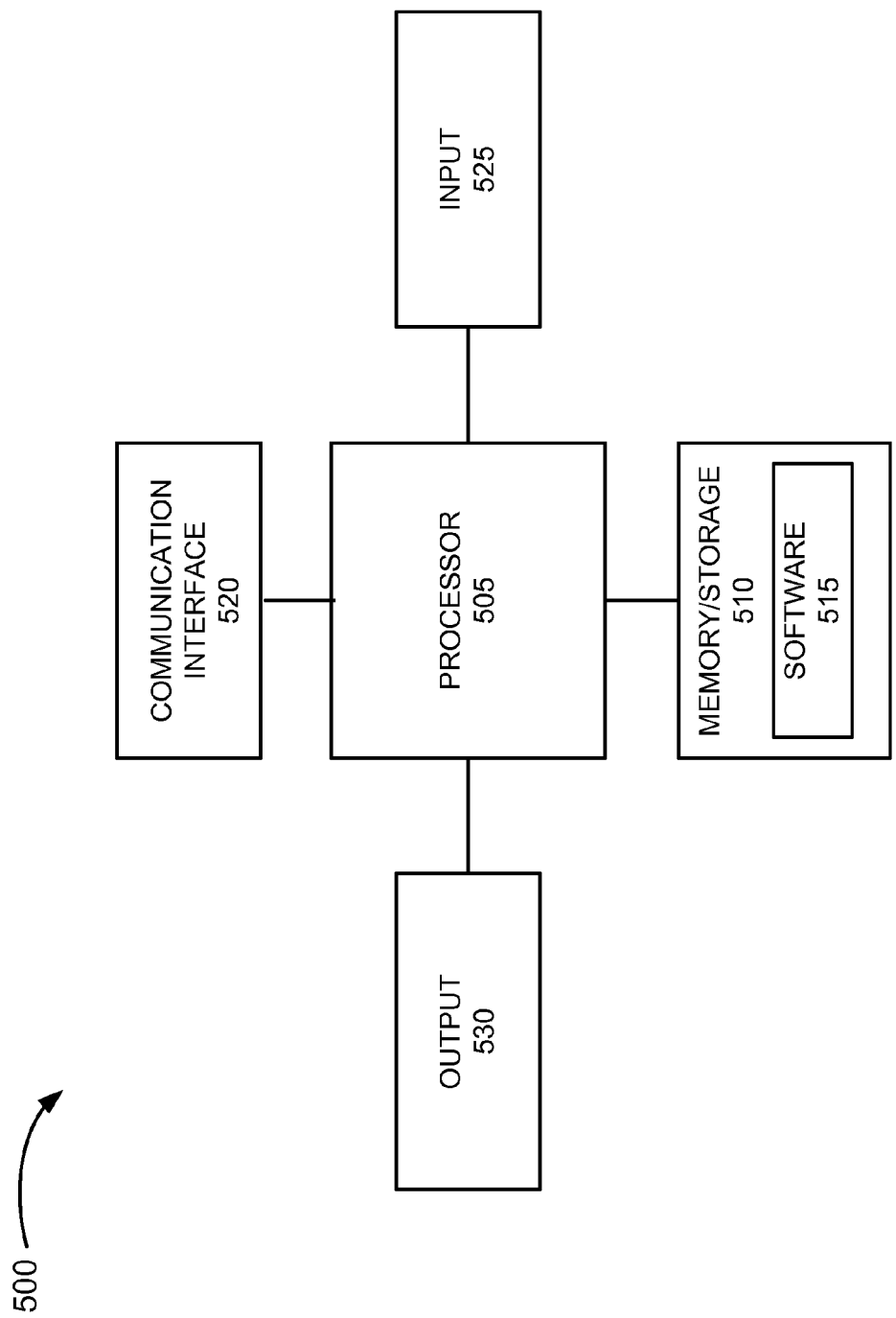

9,706,249 B2

EXTENDED, HOME, AND MOBILE CONTENT DELIVERY NETWORKS

BACKGROUND

Streaming and downloading programs are popular delivery methods for providing the programs to users. A content delivery network (CDN) (also known as a content distribution network) is typically used for streaming and/or downloading programs. The content delivery network stores the programs and services user requests for the programs.

BRIEF DESCRIPTION OF THE DRAWINGS

FIG. 1 is a diagram illustrating an exemplary environment in which an exemplary embodiment of an extended CDN may be implemented;

FIGS. 2A-2D are diagrams that illustrate exemplary scenarios pertaining to an exemplary embodiment of an extended CDN service;

FIGS. 3B-3D are diagrams illustrating another exemplary scenario pertaining to an exemplary embodiment of an error correction service provided by the extended CDN device;

FIGS. 4A-4C are diagrams that illustrate an exemplary scenario pertaining to an exemplary embodiment of a mobile extended CDN service;

FIG. 5 is a diagram illustrating exemplary components of a device that may correspond to one or more of the devices in the exemplary environment;

DETAILED DESCRIPTION OF PREFERRED EMBODIMENTS

Figure 2B:
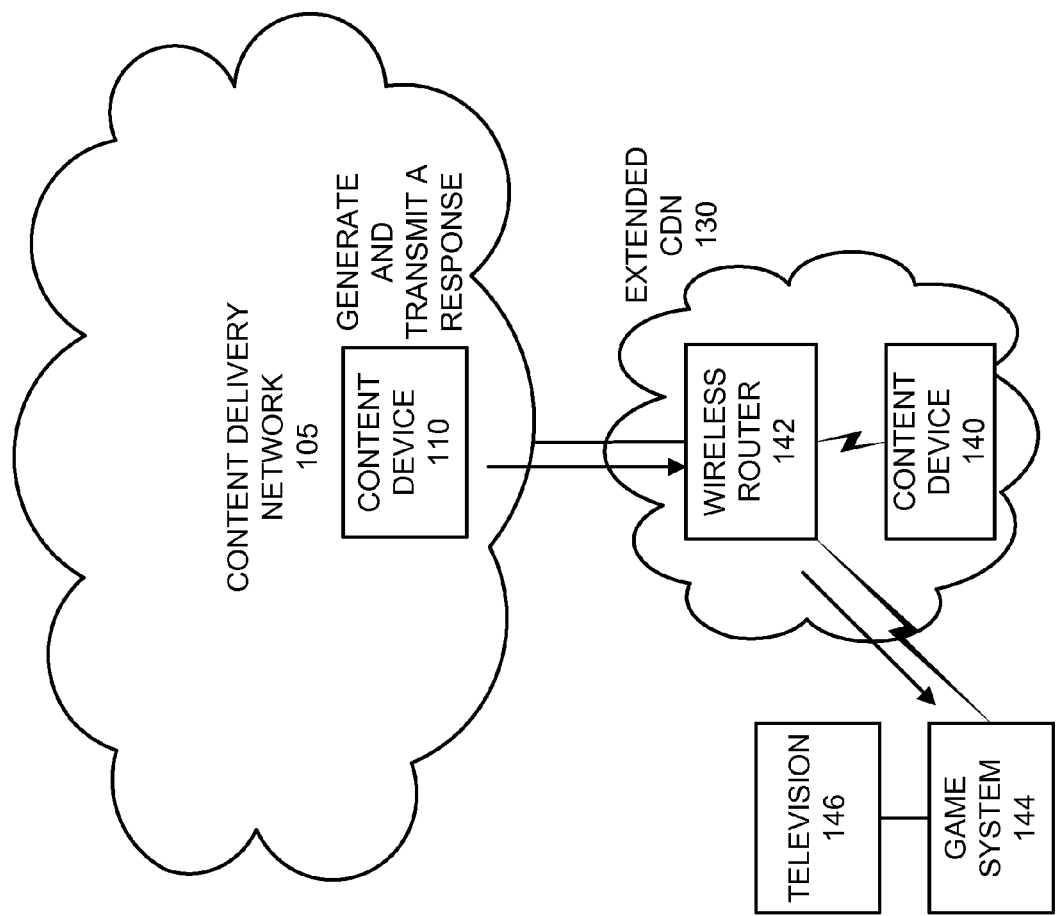

The following detailed description refers to the accompanying drawings. The same reference numbers in different drawings may identify the same or similar elements. Also, the following detailed description does not limit the invention.

As used herein, the term "program" refers to audio and/or visual content. For example, a program may include a linear television program (e.g., a movie, a program of a television series, a reality show, a documentary, etc.), an on-demand program, a pay-per-view program, music, a pre-recorded program, or a live program (e.g., broadcasted, multicasted, etc.).

A content service provider (e.g., a multiple system operator (MSO)) may offer a program service for programs. The program service may be a subscription-based program service that delivers programs to a user. The content service provider delivers programs to users via a content delivery network. Depending on the content service provider, the content delivery network may have a national geographic presence, a regional geographic presence, or a local geographic presence. By way of further example, in a national-based context, the content delivery network may include a centralized center or distributed centers that receive programs and metadata from program providers, process the programs and metadata (e.g., transcode, format, encrypt, etc.), manage digital rights (e.g., licensing, etc.), and distribute the programs and metadata to regional centers. The regional centers make the programs and metadata available to users, as well as perform other functions (e.g., user entitlement management, digital rights management, billing, program recommendations, etc.).

A content service provider, however, is faced with various problems in providing the program service to users. For example, according to the example above, the content service provider is faced with enormous cost considerations when implementing an infrastructure that supports users on a national scale. Additionally, the content service provider wants to have an infrastructure that meets quality-of-service (QoS) standards (e.g., in terms of speed of delivery, availability of programs, etc.) such that users are satisfied with the program service.

According to an exemplary embodiment, a content delivery network includes an extended content delivery network. According to an exemplary embodiment, the extended content delivery network includes in-home media devices located at the users' home and other structures (e.g., apartment buildings, condominiums, etc). The in-home media device communicates with an upper layer of the content delivery network. The in-home media device stores programs and metadata and makes the programs and metadata available to a user. For example, the user may download or stream, via a user device, a program from the in-home media device. The extended content delivery network is described further below.

Turning to another aspect of this description, traditional digital video recorder (DVR) devices are very complicated, very expensive, and not suitable for today's Over The Top (OTT) devices, such as a mobile device, a game console, and a smart television. For example, traditional DVR devices provide recording, encryption, and encoding functionalities before programs are saved to the storages of the DVR devices. However, many of the OTT devices already offer playback functions so traditional DVR designs are unnecessary.

According to an exemplary embodiment, the in-home media device stores programs in a same format as the upper layer of the CDN (e.g., a regional CDN). When an OTT device requests a program, the OTT device receives the program from the in-home media device. Depending on the implementation, the OTT may handle transcoding or formatting as needed. The DVR service of the extended CDN is described further below.

According to an exemplary embodiment, the in-home media device records, on behalf of a user, live streaming content from a multicast data channel. The in-home media device performs error correction. For example, the in-home media device continuously receives portions of the program in the form of IP packets, video chunks, file segments, etc. The in-home media device performs error correction for each portion of the program. In the event that a portion of the program (e.g., an IP packet, etc.) cannot be corrected, the in-home media device requests and receives a replacement portion of the program (e.g., an IP packet) from another server (e.g., a unicast CDN server). The error correction service of the extended CDN is described further below.

Turning to yet another aspect of this description, while mobile users have access to a CDN (e.g., a regional CDN), such access may unnecessarily use resources of the CDN. For example, a mobile user that wishes to download or stream a program may be able to obtain the program from another mobile user. In this regard, if the CDN can indicate, to the mobile user, that the program is available from the other mobile user, the mobile user may avoid using resources of the CDN. That is, the mobile user could obtain the program by downloading or streaming the program from another program source (e.g., the other mobile device).

According to an exemplary embodiment, a mobile device is a mobile CDN. For example, the mobile device includes software that provides the functionality of a CDN program server. In this way, the mobile device can provide an extended CDN service. According to an exemplary embodiment, the mobile device has hotspot capabilities.

According to an exemplary implementation, when the mobile device obtains (e.g., via download or stream) a program, the mobile device registers with the CDN. The registration process may include providing the CDN with various program information, such as a mobile CDN identifier of the mobile device, which uniquely identifies the mobile device, a program identifier that identifies the program successfully downloaded or streamed (and stored), and a program size of the program. The mobile device may also provide a location of the mobile device (e.g., longitude and latitude, etc.) and its public network address (e.g., a public IP address). When another user requests the same program from the CDN, the CDN identifies the mobile device as a program source and provides the other user with the mobile device address (e.g., a uniform resource locator (URL). The other user downloads or streams the program from the mobile device. The mobile, extended CDN service is described further below.

FIG. 1 is a diagram illustrating an exemplary environment in which an exemplary embodiment of the extended content delivery network may be implemented. As illustrated, environment 100 includes a content delivery network 105, which includes content devices 110-1 through 110-X (also referred to collectively as content devices 110 and individually or generally as content device 110). As further illustrated, environment 100 includes an extended CDN 130. Extended CDN 130 includes a content device 140 and a wireless router 142. Environment 100 also includes exemplary user devices, such as a game system 144, a television 146, a set top box 148, and a mobile device 150.

Environment 100 may be implemented to include wired, optical, and/or wireless connections among the devices and the network illustrated. A connection may be direct or indirect and may involve an intermediary device and/or an intermediary network not illustrated in FIG. 1. Additionally, the number, type (e.g., wired and wireless), and the arrangement of connections between the devices and the networks are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. By way of further example, content device 140 may be implemented as multiple devices, such as a computer and an external storage device, and/or set top box 148 and television 146 may be combined into a single device.

Additionally, or alternatively, environment 100 may include additional networks and/or differently arranged networks, than that illustrated in FIG. 1. For example, environment 100 may include an intermediary network. The types of devices and the types of networks in environment 100 are also exemplary. Also, according to other embodiments, one or more functions and/or processes described as being performed by a particular device may be performed by a different device, or some combination of devices.

Content delivery network 105 includes a network that provides access to and use of a program service. Generally, content delivery network 105 may be implemented as a satellite-based network, a terrestrial-based network, or a combination thereof. Content delivery network 105 may be implemented to download and/or stream programs using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, content delivery network 105 may include various types of network devices that contribute to the provisioning of the program service.

Content devices 110 include network devices that provide the program service, such as, a program processing device (e.g., transcoding, encryption, etc.), a digital rights management device, a licensing device, a login device (e.g., authentication, authorization, etc.), a program storage device, a metadata device, and an application server device (e.g., download and/or stream programs). Content devices 110 may include other types of network devices, such as a billing device, a program recommendation device, a user account management device, etc.

Extended CDN 130 includes a network that provides access to and use of an extended CDN device, such as content device 140. According to an exemplary embodiment, extended CDN 130 is located in a user's home, a place of business, or other similar locale. Content device 140 includes a device that communicates with content devices 110, stores programs, and is able to disburse a program to other user devices (e.g., game system 144, television 146, etc.) by way of streaming and/or downloading.

According to an exemplary implementation, content device 140 may be a user's computer (e.g., a desktop computer) or some other suitable computational device. According to such an implementation, the user installs software on the computer to allow the computer to provide extended CDN functions, as described herein. The software may include a wizard setup that, among other things, provides for an on-boarding process with CDN 105. The on-boarding process may include authenticating content device 140, assigning content device 140 with an extended CDN identifier, which uniquely identifies content device 140 and indicates content device 140 as an extended CDN device, and identifying a location (e.g., state, city, zip code, and street address; longitude and latitude coordinates; etc.) of content device 140. Content device 140 may also provide its network address (e.g., a public IP address). The on-boarding information (e.g., distributed CDN identifier, location, etc.) may be stored in one more devices in CDN 105, such as content device 110. For example, content device 110 may include an application server device that downloads and/or streams programs in a geographic region in which the user resides (e.g., the application server device from which the user would otherwise obtain a program for downloading and/or streaming).

Subsequent to the on-boarding process, content device 140 can download programs from CDN 105. The downloading of programs to content device 140 may be user-initiated (e.g., selected by the user) and/or initiated by content device 110. For example, content device 110 (e.g., a program recommendation device) may store programs on content device 140 that are deemed of interest to the user and others in a household. Content device 110 (e.g., a database management system (DMS) pertaining to the extended CDN service) may store program information when a program is downloaded. For example, the program information may include some or all of the information described during on-boarding (e.g., extended CDN identifier, location of content device 140, public network address, etc.). The program information also includes a program identifier that uniquely identifies the program. The program information may also include the size of the program (e.g., 1 Gigabyte) stored by content device 140. The program size may continually be updated during the downloading, as the program is successfully received and stored by content device 140. In this way, content device 140 (e.g., an application server device) may direct a user to obtain the program from the content device 140 before the program is fully downloaded. According to an exemplary implementation, programs stored by content device 140 are stored in a same format as that stored by content device 110.

Content device 140 can provide downloading and streaming services to user devices (e.g., game system 144, etc.). Content device 140 provides a user interface that allows the user to manage the programs stored. For example, the user can delete a program, schedule the downloading of a program from content device 110, schedule a streaming of a program from content device 110, etc. Additionally, the user may schedule downloading and/or streaming to one of the user devices. The user interface may also include a pseudo storefront that allows a user wishing to download or stream a program, to see what programs are stored on and available from content device 140. Content device 110 continuously updates, for example, an extended CDN table of programs (e.g., a table that lists the stored programs), as programs are stored on and removed from content device 140. In this way, content device 110 can determine which programs are currently stored on content device 140. For example, for each content device 140, the extended CDN table may include the extended CDN identifier, which uniquely identifies content device 140, the location of content device 140, program identifiers indicating programs stored by content device 140, sizes of the programs, and a public network address of content device 140, or a sub-combination of this information.

As previously described, according to an exemplary implementation, the user may install software on a user device (e.g., a computer) to provide the functionality of content device 140. According to other implementations, the program service provider may provide the user with a computational device. For example, the computational device may include pre-installed software that provides the functionality of content device 140. This hardware-based solution may also offer other functionalities. For example, the computational device may, in addition to the functionalities described above, include a router that offers a wireless service. For example, the computational device may include a wireless access technology (e.g., WiFi, Bluetooth, etc.) so that the computational device can form a local network with other devices.

Wireless router 142 includes a device that provides routing capabilities. For example, wireless router 142 may be implemented as an in-home router device, a broadband router, or a wireless router. Game system 144 includes a device that plays video games. For example, game system 144 may be implemented as a video game console, such as a Playstation, X-box, Wii, etc., gaming system. Game system 144 may also be implemented as a handheld gaming device, which may include a display. Game system 144 includes wireless capabilities. Television 146 may be implemented as a non-smart television, a smart television, or some other form of a display device. Television 146 may include wireless capabilities. Set top box 148 may be implemented as a client device, a thin client device, a converter box, a receiver device, a tuner device, a digibox, an IPTV set top box, or some combination thereof. Set top box 148 may include wireless capabilities. Mobile device 150 may be implemented as a smartphone, a tablet device, a computer (e.g., a laptop computer, a netbook, a palmtop computer, etc.), or some other type of end user device (e.g., an Internet access device, etc.).

According to an exemplary embodiment, the exemplary user devices (e.g., game system 144, set top box 148, television 146, and mobile device 150) each include software (e.g., a client application) that allows the user devices to communicate with content device 140 and download and/or stream a program from content device 140.

FIGS. 2A-2D are diagrams illustrating exemplary scenarios pertaining to an exemplary embodiment of the extended CDN service. Referring to FIG. 2A, assume a user (not illustrated) is using game system 144 and television 146 and wishes to stream a movie that recently has been released. Game system 144 includes the client application, as previously described. The user establishes a connection with content device 110 using the client application and via wireless router 142. The client application obtains its public network address (e.g., public IP address) and its location. For example, the client application may generate a request (e.g., an HTTP request) and ping a web site (e.g., whatismyip.com, etc.) to determine its public IP address. The client application may also store its location (e.g., during on-boarding) or use other conventional methods to determine its location (e.g., street address, etc.). The client application provides its public network address and location to content device 110. Content device 110 may perform authentication and authorization processes for the user before allowing the user to use the program service. For example, the user may be prompted for login information. According to this exemplary scenario, assume the user has successfully logged into the program service of CDN 105.

Content device 110 provides a user interface that indicates available programs (e.g., movies). The user finds a desired movie and selects to have the movie streamed. In response, content device 110 searches, for example, the extended CDN tables to determine whether any extended CDNs nearby the location of the user have the desired movie. For example, content device 110 may use the location information provided by the client application as a key to search the extended CDN tables. According to an exemplary embodiment, content device 110 selects a content device 140 closest to the user device (e.g., game system 144) and expands progressively outward, distance-wise, from the closest content device 140, until the program is found. The distance between the requesting user device (e.g., game system 144)

and content device 140 may be determined based on their respective geographic locations.

According to another exemplary embodiment, the user may set user preferences pertaining to the selection of content device 140 by content device 110. For example, the user preference may indicate giving priority to content devices 140 that belong to specified family and/or friends, which also use the extended CDN service. In this way, users of the extended CDN service may form sub-communities. According to an exemplary embodiment, when multiple content devices 140 store the program, content device 110 selects the content device 140 nearest to the requesting user device.

According to yet another exemplary embodiment, content device 110 may consider other criterion. For example, content device 110 may identify an amount of current bandwidth available for content device 110 to service users. Depending on the level of bandwidth usage, content device 110 may apply a sliding scale of distance from the location of content device 110 to select content device 140. For example, during times of lower traffic volume, content device 110 may select a content device 140 having a greater distance from the user device than would be selected when higher traffic volume exists.

According to this exemplary scenario, assume that content device 110 recently downloaded the movie to content device 140. It may be assumed that content device 140, which stores the movie, is co-located with gaming system 144. According to such circumstances, content device 110 selects content device 140. For example, content device 110 identifies that content device 140 is co-located (e.g., located within the same customer premises) with gaming system 144. Content device 110 selects content device 140 on this basis.

Referring to FIG. 2B, in response to the above-mentioned determination, content device 110 generates a response. By way of example, the response indicates that the movie is stored on content device 140. Additionally, or alternatively, for example, the response may redirect the client application to content device 140. For example, the response may include the local IP address of content device 140. The response may also include a program identifier of the movie. Content device 110 transmits the response to game system 144. Alternatively, the response may include a redirect to content device 140. Game system 144 receives the response.

Figure 2C:
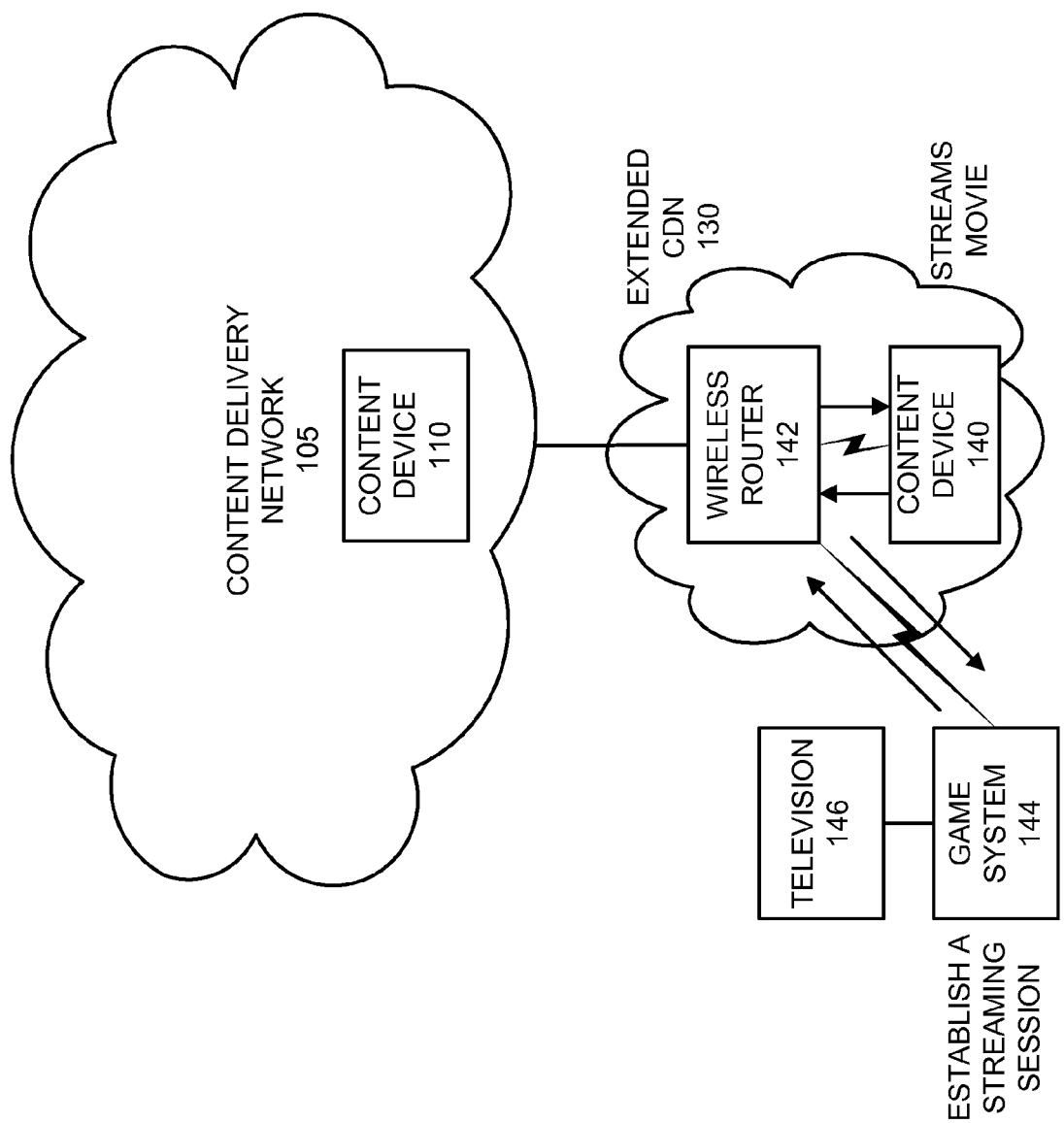

Referring to FIG. 2C, in response to receiving the response, the client application of game system 144 establishes a streaming session with content device 140. According to an exemplary implementation, the client application generates a URL for streaming a program based on the local IP address and the program identifier. Alternatively, the client application of game system 144 establishes a streaming session based on the redirect. The client application may obtain license and encryption keys from content device 110. In this way, control of licensing and digital rights management may still remain with the program service provider. Thereafter, as illustrated, content device 140 streams the movie to game system 144.

Although FIGS. 2A-2C illustrate an exemplary process associated with the extended CDN service according to one scenario, according to other scenarios, other types of processes may be performed. For example, referring to FIG. 2A, if content device 110 determines that the movie is not stored on content device 140 nor another content device 140, content device 110 will stream the movie to game system 144. Game system 144 may obtain license and encryption keys from CDN 105.

Figure 2D:
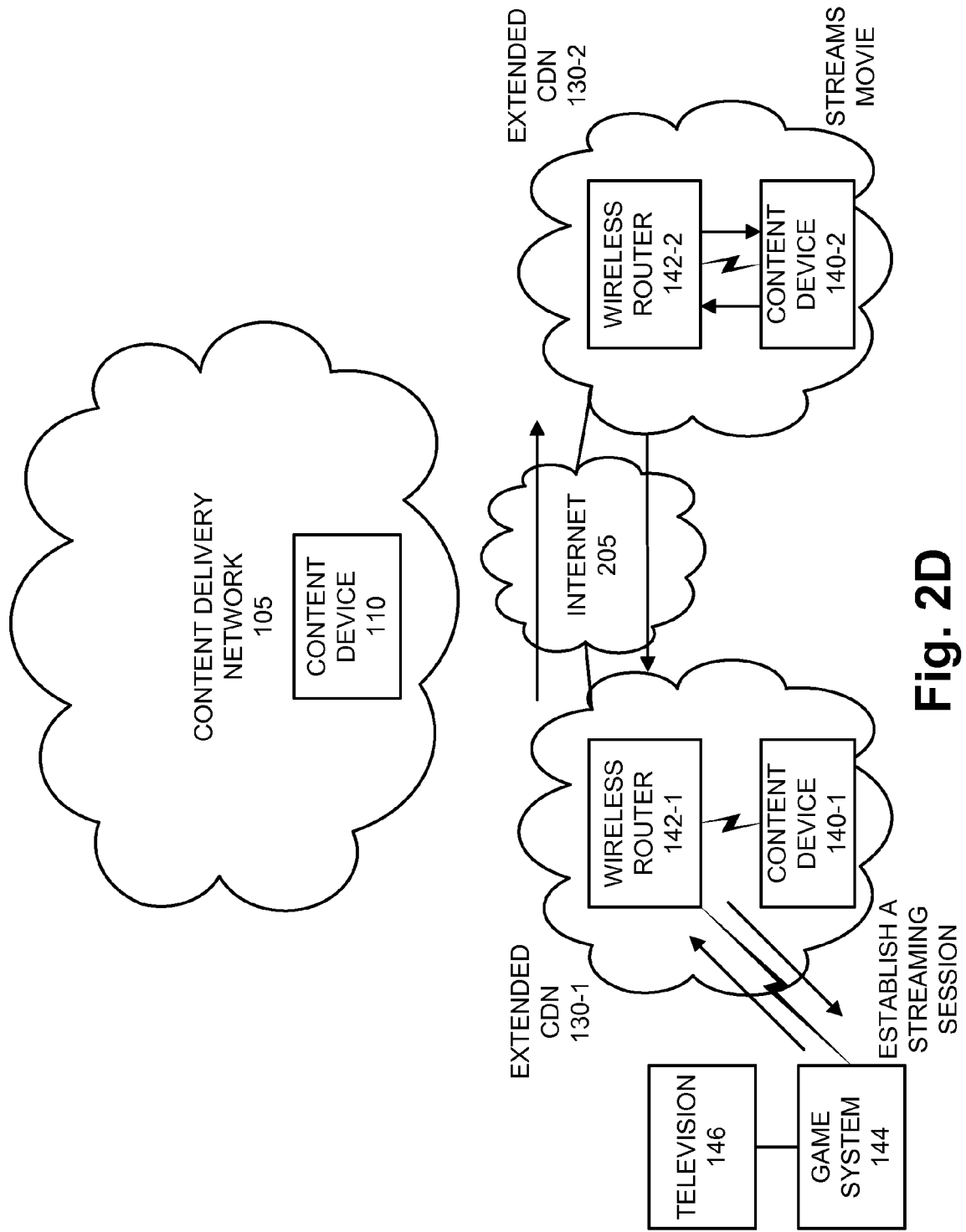

FIG. 2D is a diagram illustrating another exemplary embodiment of the extended CDN service. According to this scenario, again referring to FIG. 2A, assume that content device 110 searches the extended CDN tables and determines that although content device 140-1 does not store the movie, content device 140-2 stores the movie. For example, content device 140-2 may be a neighbor of the user and lives a very short distance away from the user. The neighbor also has the extended CDN service (e.g., content device 140-2). Referring back to FIG. 2B, content device 110 generates a response. By way of example, the response indicates that the movie is stored on another locally-distributed content device 140. Additionally, or alternatively, for example, the response may redirect the client application to content device 140-2, which is illustrated in FIG. 2D. For example, the response may include the IP address of content device 140-2. The response may also include a program identifier of the movie. Content device 110 transmits the response to game system 144. Game system 144 receives the response.

Referring to FIG. 2D, in response to receiving the response, the client application of game system 144 establishes a streaming session with content device 140-2. According to an exemplary implementation, the client application generates a URL for streaming the program based on the IP address and the program identifier. The client application may obtain license and encryption keys from CDN 105. In this way, control of licensing and digital rights management may still remain with the program service provider. Thereafter, as illustrated, content device 140-2 streams the movie to game system 144 via Internet 205.

According to other scenarios, content device 140-2 may not include the movie. For example, the information stored by content device 110 in the extended CDN table may be stale (e.g., an update message indicating the deletion of the movie from content device 140-2 has not been received or processed yet). In this regard, if content device 110 redirects gaming system 144 to content device 140-2 and content device 140-2 does not have the movie, gaming system 144 may be redirected back or return to content device 110.

In community-based extended CDNs, as described above, having a user obtain a program from his/her own content device 140 or another user's content device 140, for example, can reduce congestion in CDN 105. Additionally, for example, the user may have a better viewing experience, during high traffic conditions, using extended CDN 130 than without extended CDN 130 (e.g., using content device 110 of CDN 105).

To obtain extended CDN services, for example, the user may install software on a device (e.g., a user's own computer, etc.) to provide the functionality of content device 140 or may purchase or rent a device that provides the functionality of content device 140. Additionally, the user may share programs with other users (e.g., a neighbor, a user within a certain geographic distance, etc.). According to an exemplary embodiment, the program service provider provides incentives to users to use the extended CDN service.

According to an exemplary embodiment, the user is able to set a user preference, on content device 140, that allows for the sharing of programs, which are stored on content device 140, with other users. According to an exemplary embodiment, content device 140 includes a tracker component that monitors the sharing of programs with other users. The monitoring by the tracker may include gathering and storing program sharing information. For example, the program sharing information may include the number of programs shared (e.g., 2 programs, 5 programs, etc.) and the length of time (e.g., 5.2 hours, 8.3 hours, etc.) during which the extended service is provided. The tracker transmits the program sharing information to content device 110. The tracker includes the extended CDN identifier, which uniquely identifies content device 140, along with the program sharing information.

Content device 110 receives the program sharing information and the extended CDN identifier, and calculates a reward, based on the program sharing information and the extended CDN identifier, for the user that allows the sharing of programs. According to an exemplary implementation, the reward comes in the form of points or credits. The user can redeem any points or credits towards, for example, a bill associated with the program service, or another type of benefit program.

According to another exemplary embodiment, the user may set a user preference that does not permit the sharing of programs with other users (e.g., outside of the user's home). Content device 110 identifies, for each content device 140, whether the user associated with content device 140 has opted for such a preference when selecting a content device 140 to service a program request. In this regard, even if content device 110 determines that the content device 140 stores the program requested by another user, content device 110 omits to select the content device 140 to service a request for the program when such a user preference is in place.

The tracker may perform other functions, such as indicating to the user of content device 140, via a graphical user interface, that program sharing is occurring. For example, if the user is watching television 146 via set top box 148, a momentary overlay may appear and indicate a receipt of a request for program sharing. The overlay may also identify the program to be shared. In this way, the user may not attempt to delete the program during the extended CDN service session. The tracker may also provide the user with a user interface that indicates a log of extended CDN service sessions and the points or credits accumulated.

As previously described, the in-home media device stores programs in a same format as the upper layer of the CDN (e.g., a regional CDN). When an OTT device requests a program, the OTT device receives the program from the in-home media device. The OTT device may transcode or format the program as needed. Additionally, the in-home media device records, on behalf of a user, a live streaming program from a multicast data channel. The in-home media device performs error correction (e.g., IP packets). In the event that an IP packet cannot be error corrected, the in-home media device requests and receives a replacement IP packet from another server (e.g., a unicast CDN server). A further description of these embodiments is described further below in relation to environment 100 previously described.

Figure 3A:
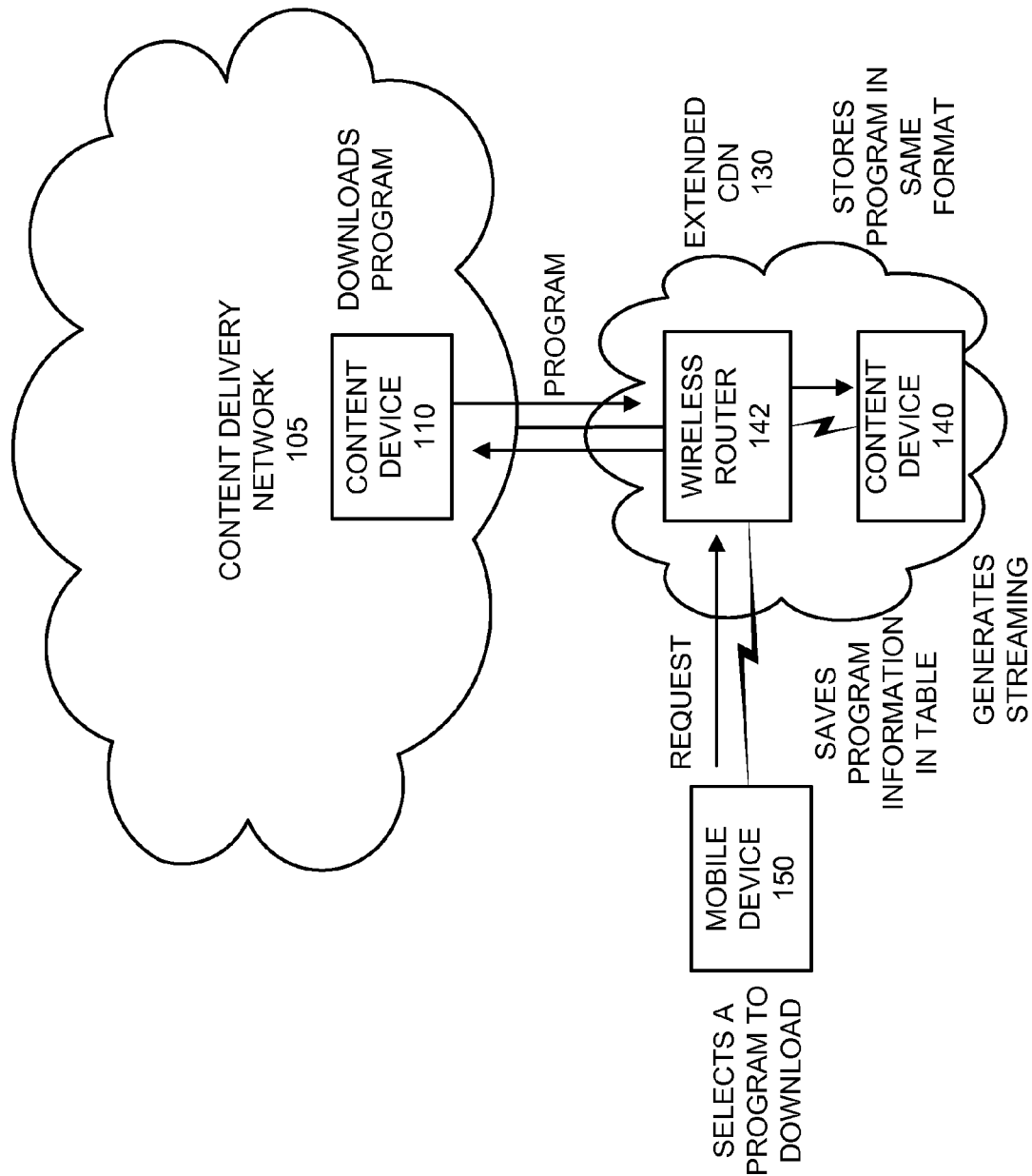
FIG. 3A is a diagram illustrating an exemplary scenario pertaining to an exemplary embodiment of a digital video recording service provided by an extended CDN device.

FIG. 3A is a diagram illustrating an exemplary scenario pertaining to an exemplary embodiment of content device 140. Referring to FIG. 3A, a program may be stored by content device 140 in the same format as a format in which the program is stored by content device 110. As an example, the content device 140 may download and store a video-on-demand (VoD) program or store a live streaming program delivered via a multicast transmission (e.g., a multicast data channel). Under the multicast scenario, the program may be stored in file chunks or other segmented form.

According to an exemplary use case, assume a user (not illustrated) operates mobile device 150 and chooses to download a VoD program. After user authentication via CDN 105 is successfully completed, content device 140 downloads the VoD program to its local storage. The file segments downloaded will be saved in exactly the same format as the file segments stored in CDN 105. Content device 140 will save the related program information into a local table. For example, the local table may include a program identifier, which uniquely identifies the program and a program size (e.g., 1 Gigabyte). Content device 140 may also generate a streaming URL, which when used, provides access to the program. The streaming URL may include the local IP address of content device 140 and the program identifier (e.g., http://192.168.1.1/1234, in which "192.168.1.1" is the local IP address and "1234" is the program identifier). The streaming URL may also be saved in the local table. As previously described, content device 140 is able to service user devices (e.g., mobile device 150) before the entire program is downloaded completely.

FIG. 3B is a diagram illustrating another exemplary scenario pertaining to an exemplary embodiment of content device 140. According to this exemplary use case, assume the user (not illustrated) operates mobile device 150 and chooses to record a live program. After user authentication is successfully completed, content device 140 identifies the scheduled airing of the live program. When the live program begins, content device 140 will save the video chunks from a multicast data channel. The video chunks or file segments are saved in the same format as the format in which they were stored, as they are received from the multicast data channel. CDN 105 may also save the live program to allow for downloading or streaming by users.

Figure 3D:
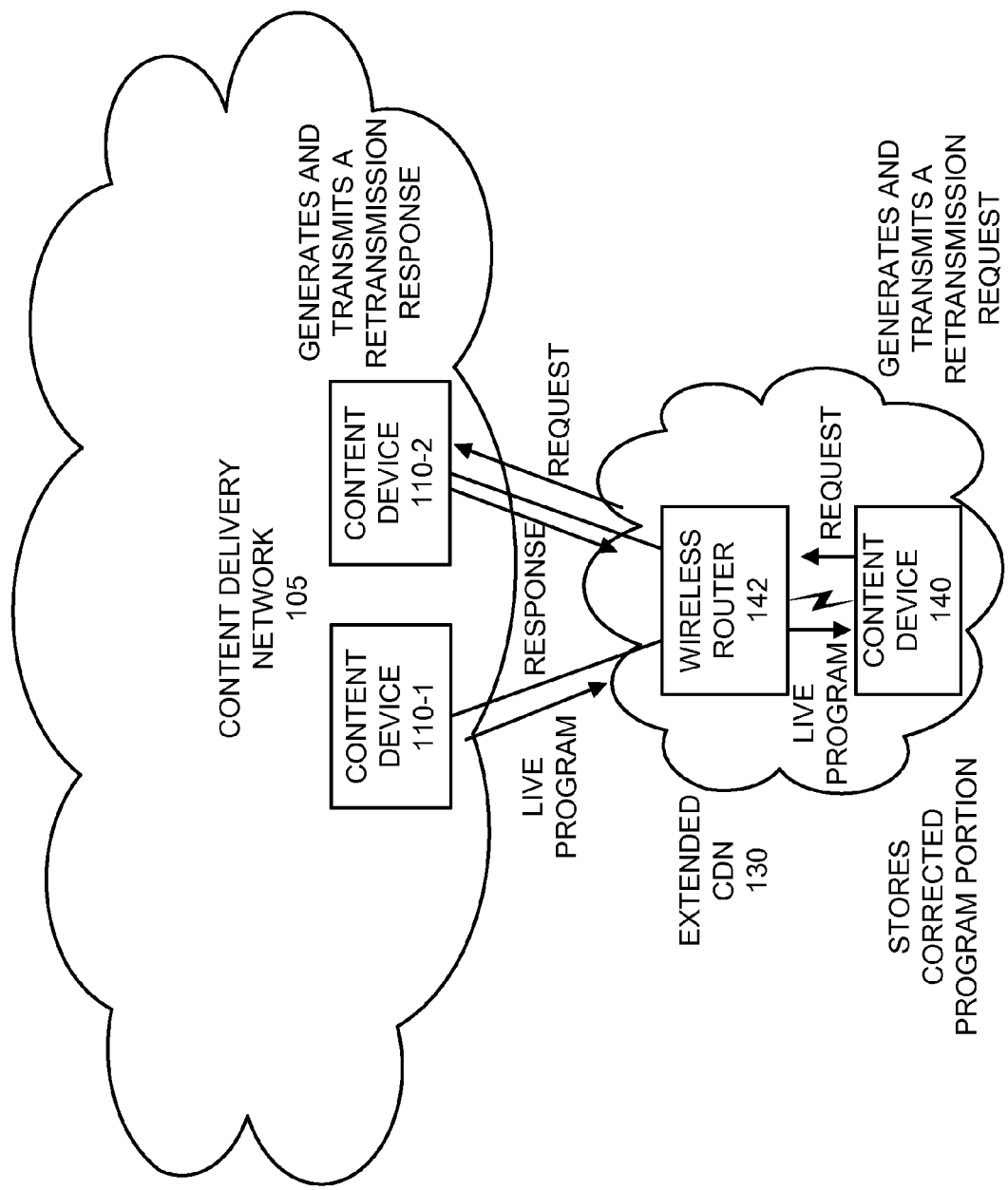

Referring to FIG. 3C, according to an exemplary embodiment, as the video chunks or file segments are received by content device 140, content device 140 performs error correction. If content device 140 is unable to correct an error, then content device 140 obtains a video chunk corresponding to the corrected segment from content device 110-2. For example, as illustrated in FIG. 3D, content device 140 generates a retransmission request. The retransmission request may include a program identifier and program portion identifier pertaining to the portion of the program that content device 140 was unable to correct. As an example, the program portion identifier may indicate a video chunk, a file segment, an IP packet, etc. Content device 140 transmits the retransmission request to content device 110-2. Content device 110-2 receives the retransmission request. In response, content device 110-2 generates and transmits a retransmission response as a unicast transmission. The retransmission response includes the needed portion of the live program.

Content device 140 receives the retransmission response and stores the corrected portion of the live program. Similar to that previously described, content device 140 generates a streaming URL and stores the related program information into the local table. Although content device 110-1 and content device 110-2 are shown as separate devices, a single content device 110 may provide the functionality of both devices. For example, content device 110 may include multiple communication interfaces that provide access to the respective services described.

As previously described, the user of mobile device 150 may stream the live program from content device 140. For example, a client application residing on mobile device 150 may generate and transmit a request for the live program from content device 140. In response to receiving the request, content device 140 may check the local table. According to this exemplary scenario, since the live program is stored (or at least a portion of the live program), content device 140 will stream the live program to the user via mobile device 150. Alternatively, the user may still have the option to stream the live program from content device 140 or content device 110. Before the streaming takes place, the client application may still need to obtain license and encryption keys from CDN 105.

According to an exemplary embodiment, mobile device 150 is a mobile CDN. According to an exemplary embodiment, mobile device 150 has hotspot capabilities. According to an exemplary implementation, when mobile device 150 obtains (e.g., downloads or stores by way of streaming) a program, mobile device 150 registers with content device 110 of CDN 105. The registration process may include storing various types of information, such as a mobile CDN identifier assigned to mobile device 150, an IP address of mobile device 150, a program identifier that identifies the program successfully downloaded or stored, a program size of the program, and a location of mobile device 150 (e.g., longitude and latitude, etc.). When another user requests the same program from content device 110 of CDN 105, content device 110 identifies mobile device 150 as a program source and provides the other user with the address of mobile device 150 (e.g., a uniform resource locator (URL). The other user downloads or streams, via a user device, the program from mobile device 150. A further description of these embodiments is described further below.

According to an exemplary embodiment, a user (not illustrated) installs extended CDN software on mobile device 150. The extended CDN software, when executed, provides the functionality of content device 110 (e.g., an application server device) that is capable of managing the downloading and/or streaming of a program to a user device, as well as other functionalities, as described herein. For example, in a manner similar to that previously described in relation to content device 140, mobile device 150 may perform an on-boarding process. For example, the mobile CDN software may include a wizard setup that, among other things, provides for an on-boarding process with CDN 105. The on-boarding process may include authenticating mobile device 150 and assigning mobile device 150 with a mobile, extended CDN identifier, which uniquely identifies mobile device 150 and indicates mobile device 150 as a mobile extended CDN device. In contrast to content device 140, since mobile device 150 is a mobile user device, location information pertaining to mobile device 150 may or may not be provided. Mobile device 150 may also provide its network address (e.g., a public IP address). The on-boarding information (e.g., extended CDN identifier, network address, etc.) is stored by content device 110.

Figure 4B:
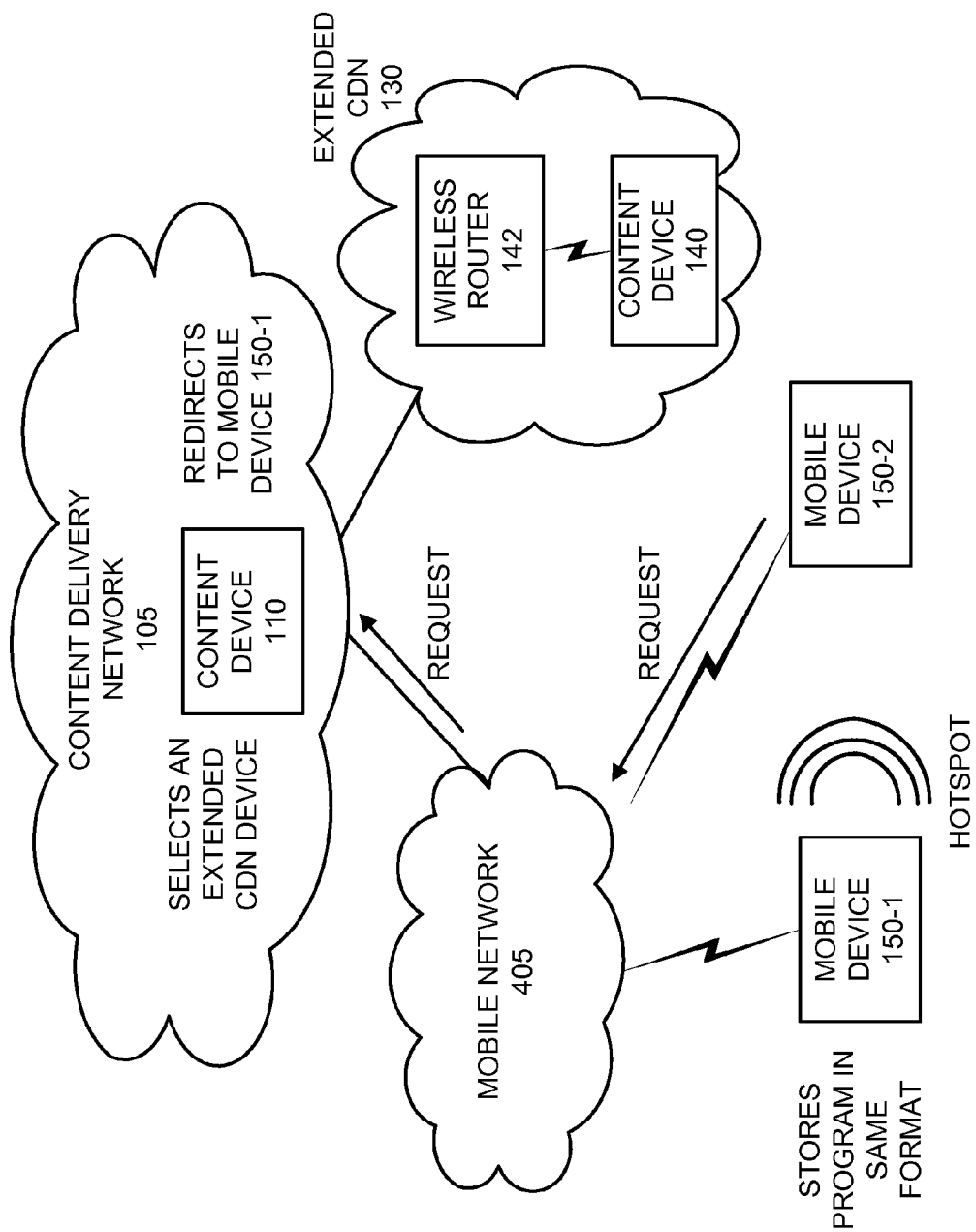
Figure 4C:
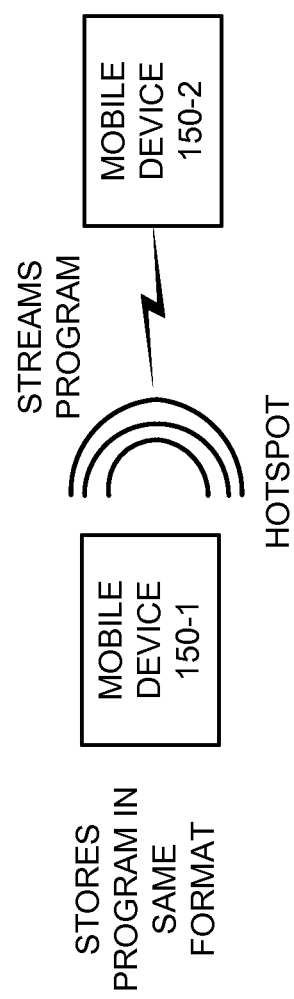

FIGS. 4A-4C are diagrams illustrating exemplary scenarios pertaining to an exemplary embodiment of a mobile extended CDN service. Referring to FIG. 4A, assume a user (not illustrated) of mobile device 150 (i.e., a mobile extended CDN device) chooses to download a program from content device 110. According to one exemplary environment, mobile device 150 may connect to content device 110 via wireless router 142 of extended CDN 130. According to another exemplary environment, mobile device 150 may connect to content device 110 via a mobile network 405. For example, mobile network 405 may be implemented to include a Long Term Evolution (LTE) network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Evolution Data Optimized (EV-DO) network, and/or another type of wireless network (e.g., an LTE Advanced network, a future generation wireless network architecture, an IP wireless network, etc.). In this example, it may be assumed that mobile device 150 connects with content device 110 via wireless router 142.

After a user authentication via CDN 105 is successfully completed, mobile device 150 transmits a request for the program, and content device 110 downloads the program to mobile device 150. Mobile device 150 stores the program (e.g., file segments, etc.) in exactly the same format as file segments stored on content device 110. According to other scenarios, the user of mobile device 150 may bookmark or schedule a downloading or streaming of the program. The user may chose to download or stream the program for the next day or at a later time (e.g., during the evening) when bandwidth usage or time to download or stream may be minimized.

During the downloading or streaming of the program, mobile device 150 may report program information to content device 110. For example, the program information may include the mobile, extended CDN identifier and the program identifier that identifies the program. Mobile device 150 may also report its geographic location, its public network address (e.g., public IP address), and the size of the portion of the program successfully downloaded thus far. Content device 110 stores the program information (e.g., in a distributed CDN table). Content device 110 may generate a URL, which when used, provides access to mobile device 150 and the program, in a manner previously described. For example, the URL may be generated based on the public network address of mobile device 150 and the program identifier. In a manner previously described, mobile device 150 may obtain its public network address by pinging a web site (or other suitable method), and provide the public network address to content device 110. The URL is also stored as the program information.

The mobile extended CDN service includes sharing a program stored on mobile device 150 with another device, such as another mobile device 150. There are various exemplary environments in which the mobile extended CDN service may be provided. For example, as previously described, mobile device 150 may include hotspot capabilities. In this regard, when the other mobile device 150 is in the proximity of mobile device 150, communication between these devices may occur via the hotspot service. Alternatively, mobile device 150 and/or the other mobile device 150 may be connected to a mobile network (e.g., mobile network 405). Still further, mobile device 150 and/or the other mobile device 150 may be connected to wireless router 142 of extended CDN 130. Still even further other environments may be envisioned, such as a wireless network in a car (e.g., an in-car entertainment system, etc.), a femto network, a pico network, a microcellular network, etc., or any other infrastructure that allows mobile devices 150 to communicate (wirelessly or otherwise). FIG. 4B is a diagram that illustrates some of these exemplary environments.

Additionally, according to various scenarios, the flow of communications may be different depending on whether the user of the other mobile device 150 knows whether a particular mobile device 150 hosts the program. For example, according to an exemplary scenario in which the user of the other mobile device 150 is unaware that mobile device 150 stores the program, the user of the other mobile device 150 may first communicate with content device 110 and, thereafter may be redirected to mobile device 150. Alternatively, content device 110 may provide the program to the other mobile device 150. According to yet another alternatively, the user of the other mobile device 150 may request that a particular mobile extended CDN device (i.e., mobile device 150) download or store the program on the other user's behalf. According to other scenarios in which the user of the other mobile device 150 is aware that mobile device 150 stores the program, the user of the other mobile device 150 may first communicate with mobile device 150.

According to an exemplary embodiment, the other mobile device 150 includes software (e.g., a client application) that allows the other mobile device 150 to communicate with content device 110 and a mobile CDN (e.g., mobile device 150).

As illustrated in FIG. 4B, according to an exemplary scenario in which the user (not illustrated) of mobile device 150-2 is unaware that mobile device 150-1 is storing the program, mobile device 150-2 establishes a connection with content device 110 via mobile network 405. After a session is established, the user is authenticated, etc., and the user selects a program. Mobile device 150-2 may provide its geographic location to content device 110. In response to receiving the program selection, content device 110 determines whether the program is available in the extended CDN network. For example, content device 110 may search the extended CDN tables. Content device 110 may use the location of mobile device 152-2 and a location associated with an extended CDN device to select the extended CDN device to service mobile device 152-2. As an example, the mobile CDN server application of mobile device 150-1 may be configured to ping one of content devices 110 with its geographic location. The pinged content device 110, in turn, updates the location of mobile device 150-1 in the extended CDN table. Additionally, or alternatively, the extended distributed CDN service may allow a user to set a user preference in which mobiles devices 150 with particular owners (e.g., friends and/or family members) are given priority when selecting a mobile device 150 to service another mobile device 150. According to still other exemplary implementations, content device 150 may select any mobile device 150 that stores the program.

According to this exemplary scenario, assume that content device 110 selects mobile device 150-1 as the extended CDN device to service mobile device 150-2. In a manner previously described, content device 110 redirects mobile device 150-2 to mobile device 150-1 based on the information included in the extended CDN table. Mobile devices 150-1 and 150-2 establish a streaming session via mobile network 405. According to other scenarios, if for any reason a program is not available from another mobile device (e.g., due to the user preference of the user of mobile device 150-2), content device 110 provides the program to mobile device 150-2. As previously described, mobile device 150-2 receives license and encryption keys from a content device 110 (e.g., a digital rights management device) of CDN 105.

Referring to FIG. 4C, according to another exemplary scenario, assume the user of mobile device 150-1 downloads a program to mobile device 150-1 from content device 110. Thereafter, the user and other family members travel, via car, to another state to visit a relative. During the trip, the user of mobile device 150-2 wishes to watch the downloaded program. Mobile device 150-2 establishes a connection with mobile device 150-1 using the hotspot capabilities of mobile device 150-1. The user of mobile device 150-2 selects the program to stream via a user interface provided by mobile device 150-1. Mobile device 150-1 streams the program to mobile device 150-2. As previously described, mobile device 150-2 receives license and encryption keys from a content device 110 (e.g., a digital rights management device) of CDN 105.

FIG. 5 is a diagram illustrating exemplary components of a device 500 that may correspond to one or more of the devices in the environments described herein. For example, device 500 may correspond to content device 110, content device 140, mobile device 150, as well as other device illustrated and described. As illustrated in FIG. 5, according to an exemplary embodiment, device 500 includes a processor 505, memory/storage 510 that stores software 515, a communication interface 520, an input 525, and an output 530. According to other embodiments, device 500 may include fewer components, additional components, different components, and/or a different arrangement of components than those illustrated in FIG. 5 and described herein.

Processor 505 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 505 may be implemented as hardware (e.g., a microprocessor, etc.), a combination of hardware and software (e.g., a SoC, an ASIC, etc.), may include one or multiple memories (e.g., cache, etc.), etc.

Processor 505 may control the overall operation or a portion of operation(s) performed by device 500. Processor 505 may perform one or multiple operations based on an operating system and/or various applications or programs (e.g., software 515). Processor 505 may access instructions from memory/storage 510, from other components of device 500, and/or from a source external to device 500 (e.g., a network, another device, etc.).

Memory/storage 510 includes one or multiple memories and/or one or multiple other types of storage mediums. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium. Memory/storage 510 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 510 may store data, software, and/or instructions related to the operation of device 500.

Software 515 includes an application or a computer program that provides a function and/or a process. Software 515 may include firmware. For example, with reference to content device 140, software 515 may include an application that, when executed by processor 515, provides the functions of the extended CDN service, the DVR service, and error correction service, as described herein. Additionally, for example, with reference to mobile 150, software 515 may include an application that, when executed by processor 515, provides the functions of the mobile extended CDN service, as described herein. Additionally, with reference to user devices (e.g., set top box 148, television 146, game system 144, and mobile device 150), software 515 may include an application that, when executed by processor 515, provides the functions of a client, as described herein. Further, with reference to content device 110, software 515 may include an application that, when executed by processor 515, provides the functions of the extended CDN service, as described herein.

Communication interface 520 permits device 500 to communicate with other devices, networks, systems, etc. Communication interface 520 may include one or multiple wireless interfaces and/or wired interfaces. Communication interface 520 may include one or multiple transmitters and receivers or transceivers. Communication interface 520 may operate according to a protocol and a communication standard.

Input 525 permits an input into device 500. For example, input 525 may include a keyboard, a mouse, a display, a touchscreen, a touchless screen, a button, a switch, an input port, speech recognition logic, and/or some other type of visual, auditory, tactile, etc., input component. Output 530 permits an output from device 500. For example, output 530 may include a speaker, a display, a touchscreen, a touchless screen, a light, an output port, and/or some other type of visual, auditory, tactile, etc., output component.

Device 500 may perform a process and/or a function, as described herein, in response to processor 505 executing software 515 stored by memory/storage 510. By way of example, instructions may be read into memory/storage 510 from another memory/storage 510 (not shown) or read from another device (not shown) via communication interface 520. The instructions stored by memory/storage 510 may cause processor 505 to perform a process described herein. Alternatively, for example, according to other implementations, device 500 may perform a process described herein based on the execution of hardware (processor 505, etc.).

Figure 6:
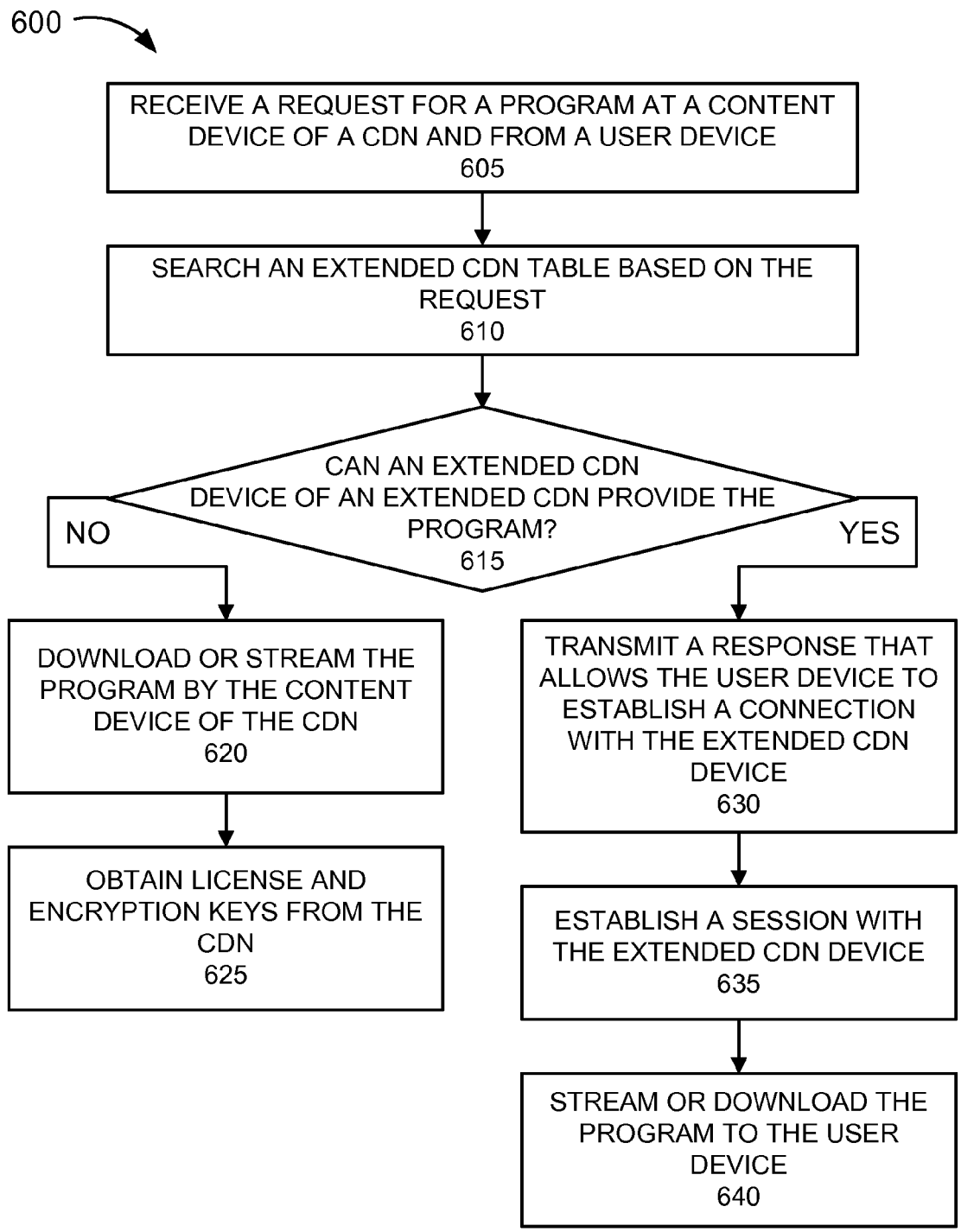
FIG. 6 is a flow diagram that illustrates an exemplary process pertaining to the extended CDN service.

FIG. 6 is a flow diagram illustrating an exemplary process 600 pertaining to an exemplary embodiment of the extended CDN service. Process 600 is directed to a process previously described above with respect to FIGS. 2A-2D and elsewhere in this description, in which content device 110 uses an extended CDN service to service a request for a program. According to an exemplary embodiment, content device 110 performs one or more of the steps described in process 600. For example, processor 505 may execute software 515 to perform the steps described. As described below in relation to process 600, it may be assumed that a user of the user device successfully logged into CDN 105.

Referring to FIG. 6, process 600 begins, in block 605, by receiving a request for a program at a content device of a CDN and from a user device. For example, the user of the user device (e.g., game system 144, television 146, set top box 148, mobile device 150) requests, via the user device, a program to be downloaded or streamed from content device 110 of CDN 105. The user device may also provide other information to content device 110, such as a public network address of the user device and a location of the user device. It may be assumed that the user of the user device was successfully logged into the program service of CDN 105.

In block 610, a search of an extended CDN table is performed in response to the request. For example, content device 110 searches extended CDN tables to determine whether the program can be downloaded or streamed from content device 140. Content device 110 may use the location of the user device as a key to search the extended CDN tables. Additionally, or alternatively, content device 110 may use, if present, a user preference from the user, to select content device 140. For example, as previously described, the user preference may afford a priority to certain content devices 140 (e.g., devices that belong to family and/or friends) when selecting content device 140 to service the user's request for the program. Additionally, or alternatively, content device 110 may use another criterion, such as the current bandwidth usage, as previously described. As previously described, the extended CDN tables include the extended CDN identifiers, which uniquely identify content devices 140, the locations of content devices 140, program identifiers indicating programs stored by content devices 140, program sizes of the programs, and public network addresses of content devices 140, or a sub-combination of such information.

In block 615, it is determined whether an extended CDN device of an extended CDN can be used to provide the program to the user device. For example, content device 110 determines whether a content device 140 can provide extended CDN service to the user device, in which the program can be downloaded or streamed, from the content device 140 and to the user device, based on the searching. If it is determined that the extended content device of the extended CDN cannot provide the extended service (block 615—NO), then content device of the CDN downloads or streams the program to the user device (block 620). For example, content device 140 downloads or streams the program to the user device. In block 625, license and encryption keys are obtained. For example, the user device obtains license and encryptions keys from CDN 105.

If it is determined that the extended content device of the extended CDN can provide the program (block 615—YES), then the content device of the CDN transmits a response to the user device and allows the user device to establish a connection with the extended CDN device. For example, content device 110 may generate a response that includes a network address of content device 140. Additionally, the response includes a program identifier that identifies the program.

In block 635, a session with the extended CDN device is established. For example, the user device generates a URL based on the network address of content device 140 and the program identifier. The user device establishes a session with content device 140 based on the URL.

In block 640, the program is streamed or downloaded from the extended CDN device to the user device. For example, content device 140 downloads or streams the program to the user device.

Although FIG. 6 illustrates an exemplary extended CDN service process 600, according to other embodiments, process 600 may include additional operations, fewer operations, and/or different operations than those illustrated in FIG. 6 and described. For example, processes associated with the on-boarding of content device 140 and the downloading or storing of programs by content device 140 have been omitted from process 600 for the sake of simplicity, but have been described elsewhere in this description. Such processes may modify process 600. Additionally, or alternatively, processes pertaining to the tracking of program sharing, awarding and redeeming credits have been omitted from process 600 for the sake of simplicity, but have been described elsewhere in this description. Such processes may also modify process 600.

Figure 7A:
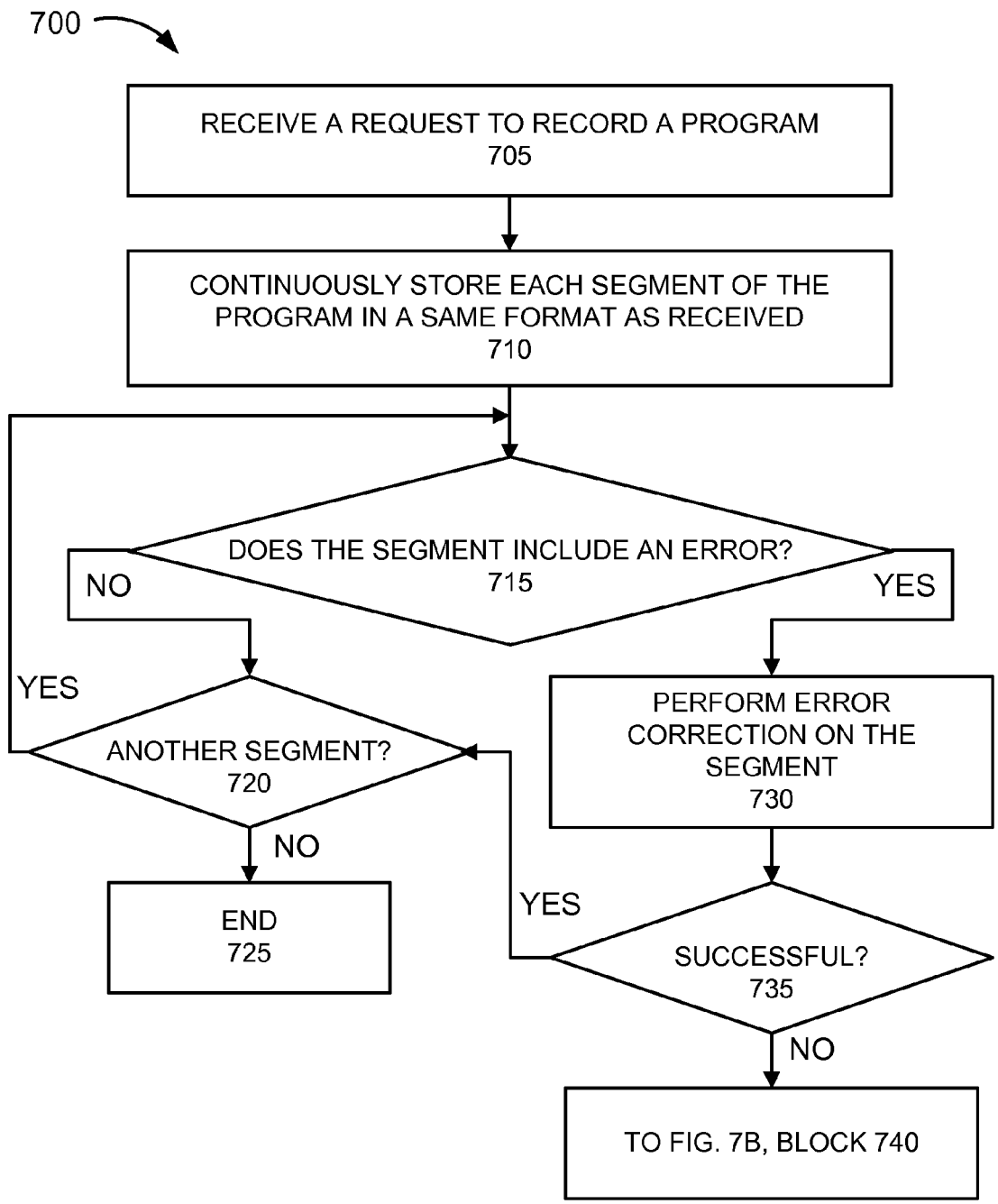
FIGS. 7A and 7B are flow diagrams that illustrate an exemplary process pertaining to the digital video recording service and the error correction service.
Figure 7B:
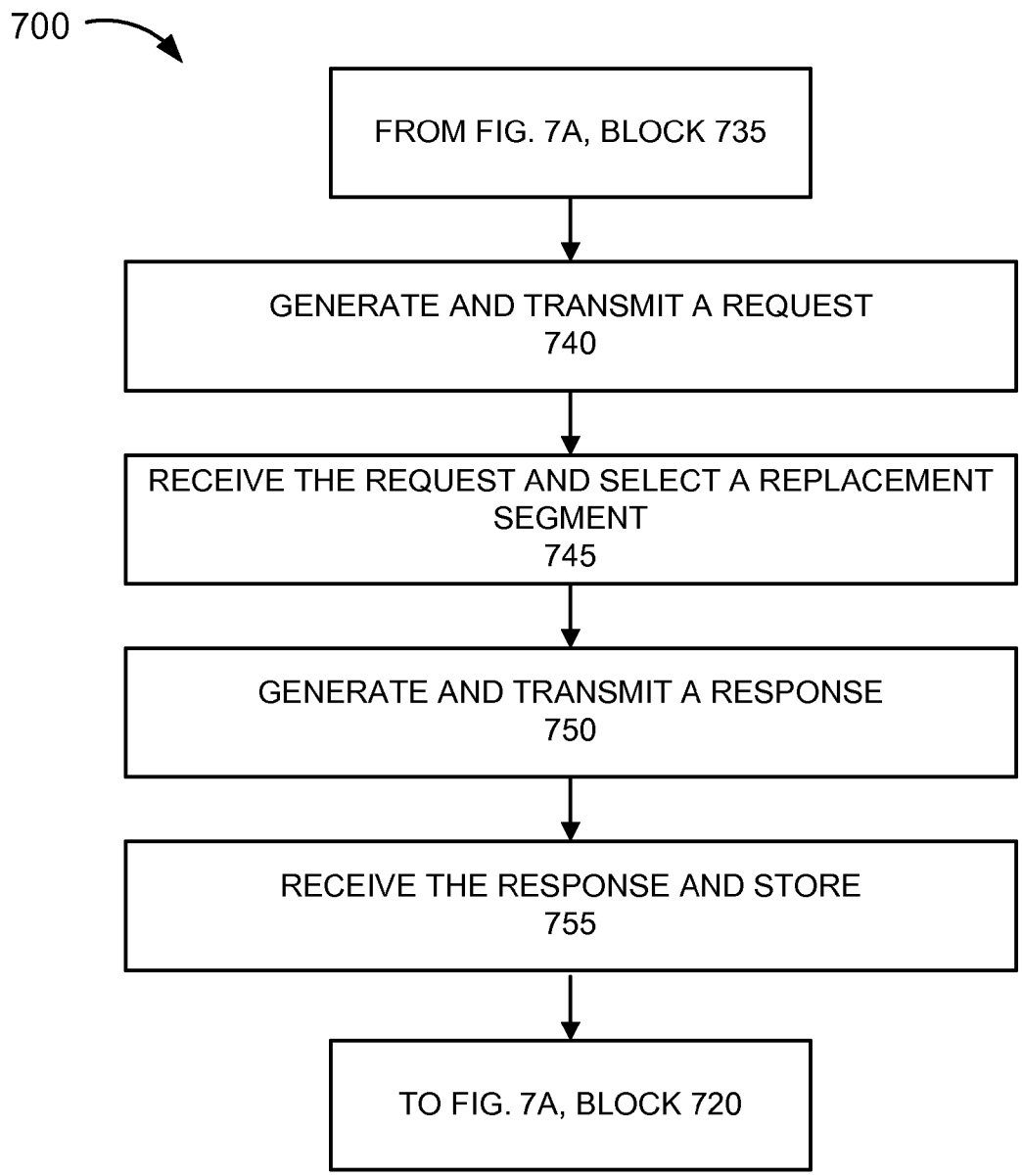

FIGS. 7A and 7B are flow diagrams illustrating an exemplary process 700 pertaining to an exemplary embodiment of the DVR and error correction services. Process 700 is directed to a process previously described above with respect to FIGS. 3A-3D and elsewhere in this description, in which content device 140 provides DVR and error correction services. According to an exemplary embodiment, content device 140 performs one or more of the steps described in process 700. For example, processor 505 may execute software 515 to perform the steps described.

Referring to FIG. 7A, process 700 begins, in block 705, by receiving a request to record a program. For example, content device 140 receives the request to record the program. As previously described, content device 140 offers a DVR service. The program may be a live program that is delivered from content device 110 of CDN 105 to content device 140 via a multicast transmission.

In block 710, each segment of the program is continuously stored in a same format as the format in which the program is stored at the transmitting content device. For example, content device 140 stores each segment of the program (e.g., a file segment, video chunk, etc.) in a same format as the format of each segment stored by content device 110.

In block 715, it is determined whether the segment includes an error. For example, content device 140 may analyze a segment that is stored and determine whether an error exists in the segment. For example, content device 140 may use a hash function, a checksum algorithm, and/or other suitable error detection measures. If it is determined that the segment does not include an error (block 715—NO), then it is determined whether there is another segment (block 720). If there is another segment (block 720—YES), then process 700 continues to block 715 for processing another segment. If it is determined that there is not another segment (block 720—YES), then process 700 ends (block 725). In this case, it may be assumed that all segments of the program have been received from content device 110 and stored by content device 140 (e.g., in block 710). As previously described, content device 140 may download or stream the program to a user device, upon request. The user device may need to obtain license and encryption keys from CDN 105.

If it is determined that the segment includes an error (block 715—YES), then content device 140 performs error correction on the segment (block 730). For example, content device 140 may use an error-correcting code, forward error correction, and/or other error correction measures to attempt to correct the error that exists in the segment.

In block 735, it is determined whether the error correction is successful. For example, content device 140 determines whether the error correction of the segment is successful based on a result of the error correction. If it is determined that the error correction is successful (block 735—YES), then process 700 continues to block 720, as illustrated in FIG. 7A. If it is determined that the error correction is not successful (block 735—NO), the process 700 continues to block 740 of FIG. 7B.

As illustrated in FIG. 7B, in block 740, a request is generated and transmitted. For example, content device 140 generates a retransmission request. The retransmission request may include a program identifier, which identifies the program, and a program portion identifier, which uniquely identifies the segment that content device 140 was unable to correct. Content device 140 transmits the retransmission request to content device 110. As previously described, content device 110 may or may not reside in the same content device 110 described in block 710.

In block 745, the request is received and a replacement segment is selected. For example, content device 110 receives the retransmission request and selects the replacement segment based on the program identifier and the program portion identifier. In block 750, a response is generated and transmitted. For example, content device 110 generates a replacement response and transmits the replacement response to content device 140. The replacement response includes the replacement segment.

In block 755, the response is received and stored. For example, content device 140 receives the response. Content device 140 extracts the replacement segment from the replacement response and stores the segment (e.g., with other segment(s)). Process 700 continues to block 720.

Although FIGS. 7A and 7B illustrate an exemplary DVR and error correction process 700, according to other embodiments, process 700 may include additional operations, fewer operations, and/or different operations than those illustrated in FIGS. 7A and 7B and described herein. For example, although process 700 was described such that the program was initially transmitted as a multicast by content device 110, according to other implementations, the program may be initially transmitted as a broadcast.

Figure 8:
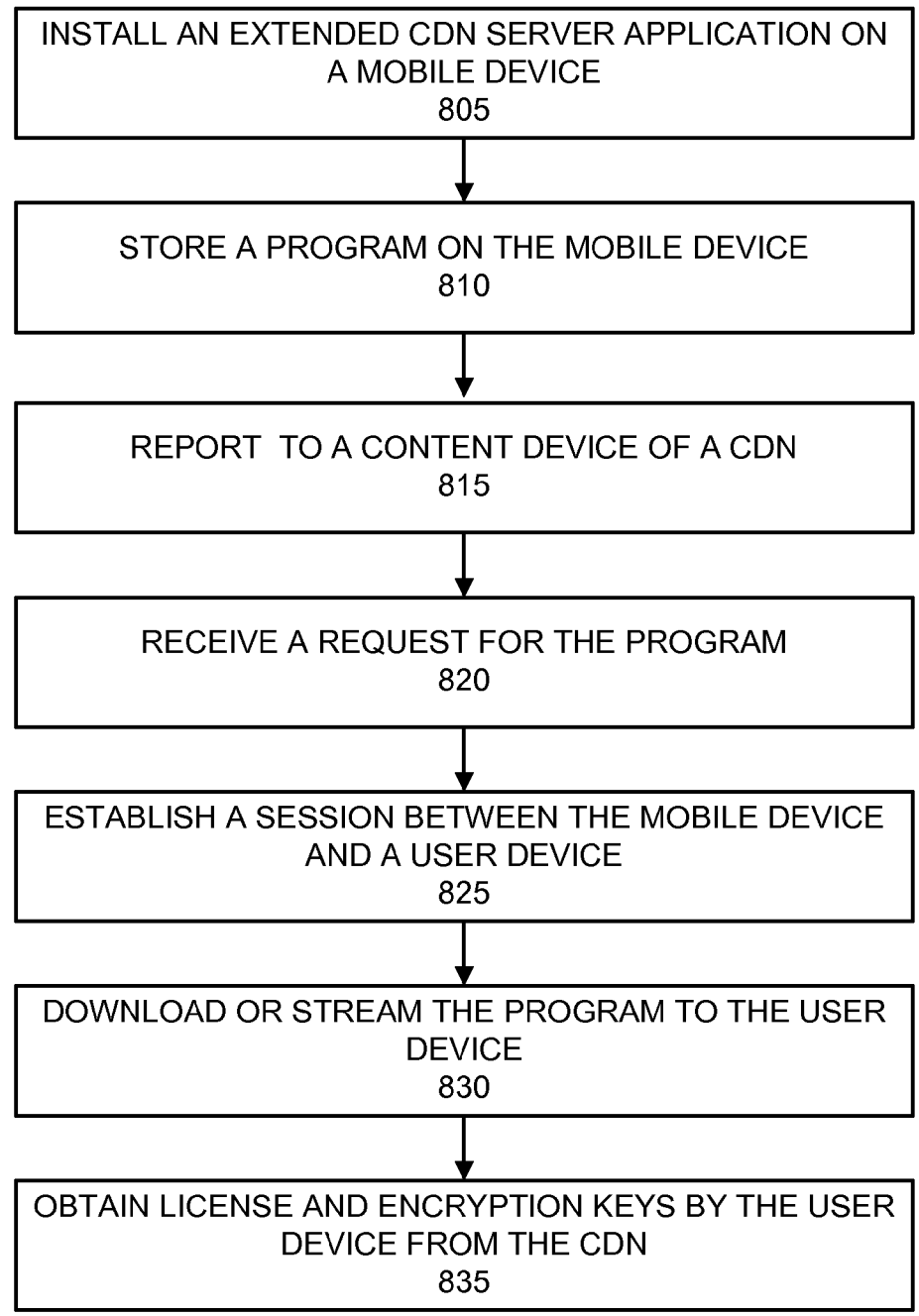
FIG. 8 is a flow diagram that illustrates an exemplary process pertaining to the mobile extended CDN service.

FIG. 8 is a flow diagram illustrating an exemplary process 800 pertaining to the mobile extended CDN service. Process 800 is directed to a process previously described above with respect to FIGS. 4A-4C and elsewhere in this description, in which mobile device 150 provides the mobile extended CDN service. According to an exemplary embodiment, mobile device 150 performs one or more of the steps described in process 800. For example, processor 505 may execute software 515 to perform the steps described.

Referring to FIG. 8, process 800 begins, in block 805, by installing an extended CDN server application on a mobile device. For example, a user of mobile device 150 installs software that provides the functionality of a CDN server, as described herein. Subsequent to installation of the software, mobile device 150 behaves as an extended CDN device. Additionally, as previously described, mobile device 150 performs an on-boarding process with content device 110 of CDN 105. The on-boarding process includes assigning a mobile, extended CDN identifier to mobile device 150, as well as other steps, as previously described.

In block 810, a program is stored on the mobile device. For example, a user of mobile device 150 downloads or streams and stores a program. Mobile device 150 stores the program in a same format as the format of the program stored by content device 110 of CDN 105. In block 815, the mobile device reports to a content device of a CDN. For example, mobile device 150 reports program information to content device 110, as previously described. The program information may include, for example, the mobile, extended CDN identifier, a program identifier of the program stored, a public network device of mobile device 150, a program size, etc., as previously described. Content device 110 stores the program information. Content device 110 may generate a URL, which when used, provides access to mobile device 150 and the program.

In block 820, a request for the program is received. For example, content device 110 may receive an initial request from a user device for the program. Content device 110 may search an extended CDN table, select mobile device 150, and redirect the user device to mobile device 150. The redirected user device may send a request for the program. Mobile device 150 receives the request and determines that the program is stored by mobile device 150. According to other examples, the user of user device may know that the program is stored on mobile device 150. The user may initiate a session with mobile device 150 via the user device.

In block 825, a session is established between the mobile device and the user device. For example, mobile device 150 establishes a session with the user device. As previously described, depending on the circumstances, mobile device 150 and the user device may establish the session using, for example, the hotspot capabilities of mobile device 150, using a mobile network (e.g., mobile network 405), or extended CDN 130 (e.g., via wireless router 142).

In block 830, the program is downloaded or streamed to the user device. For example, mobile device 150 downloads or streams the program to the user device.

In block 835, license and encryption keys are obtained by the user device from a content device of the CDN. For example, the user device obtains license and encryption keys from content device 110 (e.g., a digital rights management device) of CDN 105. Thereafter, the user of user device is able to view the program.

Although FIG. 8 illustrates an exemplary backup process 800, according to other embodiments, process 800 may include additional operations, fewer operations, and/or different operations than those illustrated in FIG. 8 and described.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6, 7A, 7B, and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 505, etc.), or a combination of hardware and software (e.g., software 515). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 505) of a computational device. A non-transitory storage medium includes one or more of the storage mediums described in relation to memory/storage 510.

No element, act, or instruction described in the present application should be construed as critical or essential to the embodiments described herein unless explicitly described as such.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   providing, by a server device and to user devices, a program service that includes at least one of downloading or streaming of programs to the user devices, wherein the server device is a part of a content delivery network of a program service provider and is not a customer premises device;
   receiving, by the server device and from one of the user devices, a request to download or stream a beginning of a program from the server device, wherein the program is one of the programs;
   searching, by the server device, extended content delivery network information in response to the receiving, wherein the extended content delivery network information indicates customer premises devices via which the user devices receive the program service and having the functionality of the server device of the content delivery network and residing in user networks, wherein the customer premises devices form an extended content delivery network and store one or more of the programs, in a same format as the programs stored in the content delivery network, and each customer premises device provides the program service for each program stored by the customer premises device;
   determining, by the server device, whether one of the customer premises devices stores the program based on the searching of the extended content delivery network information;
   transmitting, by the server device, a response to the user device in response to determining that the one of the customer premises devices stores the program, wherein the response indicates that the one of the customer premises devices stores the program; and downloading or streaming, by the server device and to the user device, the beginning of the program in response to determining that none of the customer premises devices store the program.

2. The method of claim 1, wherein the extended content delivery network information includes, for each customer premises device, an extended content delivery network identifier, which uniquely identifies the customer premises device as an extended content delivery network device, geographic location information that indicates a geographic location of the customer premises device, a public network address associated with the customer premises device, and a program identifier for each program stored by the customer premises device, and wherein the request includes geographic information that indicates a geographic location of the user device, and wherein the searching comprises:

using the geographic location of the user device as a key to search the extended content delivery network information; and selecting the one of the customer premises devices based on a distance between the user device and the one of the customer premises devices.

3. The method of claim 1, wherein the response includes a network address of the one of the customer premises devices and a program identifier of the program, and the method further comprises:

receiving, by the user device, the response;

generating, by the user device, a uniform resource locator (URL) based on the network address and the program identifier;

establishing, by the user device, a session with the one of the customer premises devices based on the URL, wherein the session includes downloading or streaming the program from the one of the customer premises devices; and obtaining, by the user device, licensing and encryption keys from the content delivery network.

4. The method of claim 1, further comprising:

tracking, by the one of the customer premises devices, at least one of a number of programs downloaded or streamed to one or more user devices or a length of time for which each download or stream to a user device is provided.

5. The method of claim 4, further comprising:

generating a credit, for a user associated with the one of the customer premises devices, based on the tracking.

6. The method of claim 1, further comprising:

storing a user preference on behalf of a user of the one of the user devices, wherein the user preference indicates a preference for one or more customer premises devices when selecting a customer premises device to service the request, wherein the one or more customer premises devices are associated with at least one of one or more friends or one or more family members of the user; and selecting the one of the customer premises devices to service the request based on the user preference.

7. The method of claim 1, further comprising:

displaying, to another user of the one of the customer premises devices, a message that indicates the request for the program is received and an identifier of the program.

8. A network device comprising:

a communication interface;

a memory, wherein the memory stores instructions; and a processor, wherein the processor executes the instructions to:

provide to user devices a program service that includes at least one of downloading or streaming of programs to the user devices, wherein the network device is a part of a content delivery network of a program service provider and is not a customer premises device;

receive, via the communication interface and from one of the user devices, a request to download or stream a beginning of a program from the network device, wherein the program is one of the programs;

search extended content delivery network information in response to the receipt of the request, wherein the extended content delivery network information indicates customer premises devices of user networks receiving the program service and having the functionality of the network device of the content delivery network and residing in user networks, wherein the customer premises devices form an extended content delivery network and store one or more of the programs, in a same format as the programs stored in the content delivery network, and each customer premises device provides the program service for each program stored by the customer premises device;

determine whether one of the customer premises devices stores the program based on a search;

transmit, via the communication interface, a response to the user device in response to a determination that the one of the customer premises devices stores the program, wherein the response indicates that the one of the customer premises devices stores the program and download or stream, via the communication interface, the beginning of the program to the user device in response to a determination that none of the customer premises devices store the program.

9. The network device of claim 8, wherein the extended content delivery network information includes, for each customer premises device, an extended content delivery network identifier, which uniquely identifies the customer premises device as an extended content delivery network device, geographic location information that indicates a geographic location of the customer premises device, a public network address associated with the customer premises device, and a program identifier for each program stored by the customer premises device, and wherein the request includes geographic information that indicates a geographic location of the user device, and wherein, when searching, the processor further executes the instructions to:

use the geographic location of the user device as a key to search the extended content delivery network information; and select the one of the customer premises devices based on a distance between the user device and the one of the customer premises devices.

10. The network device of claim 8, wherein the processor further executes the instructions to:

store a user preference on behalf of a user of the one of the user devices, wherein the user preference indicates a preference for one or more customer premises devices when selecting a customer premises device to service the request, wherein the one or more customer premises devices are associated with at least one of one or more friends or one or more family members of the user; and select the one of the customer premises devices to service the request based on the user preference.

11. The network device of claim 8, wherein the processor further executes the instructions to:
transmit, via the communication interface, a license and an encryption key to the one of the user device for use with the one of the programs in response to the determination that the one of the customer premises devices stores the program.

12. The network device of claim 8, wherein the processor further executes the instructions to:
receive, via the communication interface and from the one of the customer premises devices, program sharing information that indicates at least one of a number of programs downloaded or streamed to one or more user devices or a length of time for which each download or stream to a user device is provided; and
calculate a credit, for a user associated with the one of the customer premises devices, based on the program sharing information.

13. The network device of claim 8, wherein the response redirects the user device to the one of the customer premises devices.

14. The network device of claim 8, wherein the processor further executes the instructions to:
identify whether the user device is co-located with one of the customer premises devices that stores the program.

15. The network device of claim 8, wherein the program is a movie, and wherein the processor further executes the instructions to:
identify whether a user preference exists pertaining to the customer premises devices in which program sharing is not permitted; and
omit to select any customer premises device, which stores the program, as a customer premises device to service the request based on the user preference pertaining to the customer premises devices.

16. A non-transitory, computer-readable storage medium storing instructions executable by a processor of a computational device, which when executed cause the computational device to:
provide, to user devices, a program service that includes at least one of downloading or streaming of programs to the user devices, wherein the computational device is a part of a content delivery network of a program service provider and is not a customer premises device;
receive, from one of the user devices, a request to download or stream a beginning of a program from the computational device, wherein the program is one of the programs;
search extended content delivery network information in response to the receipt of the request, wherein the extended content delivery network information indicates customer premises devices of user networks receiving the program service and having the functionality of the computational device of the content delivery network and residing in user networks, wherein the customer premises devices form an extended content delivery network and store one or more of the programs, in a same format as the programs stored in the content delivery network, and each customer premises device provides the program service for each program stored by the customer premises device;
determine whether one of the customer premises devices stores the program based on a search;
transmit a response to the user device in response to a determination that the one of the customer premises devices stores the program, wherein the response indicates that the one of the customer premises devices stores the program; and
download or stream the beginning of the program to the user device in response to a determination that none of the customer premises devices store the program.

17. The non-transitory, computer-readable storage medium of claim 16, further storing instructions executable by the processor of the computational device, which when executed cause the computational device to:
store a user preference on behalf of a user of the one of the user devices, wherein the user preference indicates a preference for one or more customer premises devices when selecting a customer premises device to service the request, wherein the one or more customer premises devices are associated with at least one of one or more friends or one or more family members of the user; and
select the one of the customer premises devices to service the request based on the user preference.

18. The non-transitory, computer-readable storage medium of claim 16, further storing instructions executable by the processor of the computational device, which when executed cause the computational device to:
transmit a license and an encryption key to the one of the user device for use with the one of the programs in response to the determination that the one of the customer premises devices stores the program.

19. The non-transitory, computer-readable storage medium of claim 16, further storing instructions executable by the processor of the computational device, which when executed cause the computational device to:
identify whether the user device is co-located with one of the customer premises devices that stores the program.

20. The non-transitory, computer-readable storage medium of claim 16, further storing instructions executable by the processor of the computational device, which when executed cause the computational device to:
determine whether a user preference identifies customer premises devices in which program sharing is not permitted; and
omit to select any customer premises device, which stores the program, as a customer premises device to service the request based on the user preference.

21. A method comprising:
installing, by a mobile device, an extended content delivery network server application on the mobile device, wherein the extended content delivery network server application, when executed by the mobile device, provides a functionality of at least one of a downloading program server device or a streaming program server device of an at least one of a downloading program server device or a streaming program server device of a content delivery network of a program service provider;
receiving, by the mobile device and from a content device of the content delivery network, a program via download or stream;
storing, by the mobile device, the program, wherein the program is stored in a same format as a format of the program stored in the content delivery network; and
transmitting, by the mobile device and to a content device of the content delivery network, program information, wherein the program information includes an extended content delivery network identifier, which uniquely identifies the mobile device as a mobile, extended content delivery network device, a program identifier, which uniquely identifies the program, a geographic location of the mobile device, and a public network address of the mobile device, wherein the mobile device continuously updates its geographic location as it moves to different geographic locations.

22. The method of claim 21, further comprising:
receiving, by the mobile device and from a content device of the content delivery network, a request to download or stream the program, wherein the request originates from another request by a user of a user device to download or stream the program from the content delivery network; and
downloading or streaming, by the mobile device and to the user device, in response to receiving the request.

23. The method of claim 21, further comprising:
receiving, by the content device and from a user device, a request for the program;
identifying, by the content device, that the mobile device stores the program; and
selecting, by the content device, the mobile device to service the request.

* * * * *